United States Patent
Maeda et al.

(10) Patent No.: US 9,081,596 B2
(45) Date of Patent: Jul. 14, 2015

(54) INFORMATION PROCESSING DEVICE, VIRTUAL MACHINE CREATION METHOD, AND APPLICATION DISTRIBUTION SYSTEM

(75) Inventors: Manabu Maeda, Osaka (JP); Hideki Matsushima, Osaka (JP); Tomoyuki Haga, Nara (JP); Kenneth Alexander Nicolson, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 360 days.

(21) Appl. No.: 13/515,384

(22) PCT Filed: Mar. 8, 2011

(86) PCT No.: PCT/JP2011/001343
§ 371 (c)(1),
(2), (4) Date: Jun. 12, 2012

(87) PCT Pub. No.: WO2011/114655
PCT Pub. Date: Sep. 22, 2011

(65) Prior Publication Data
US 2012/0260250 A1    Oct. 11, 2012

(30) Foreign Application Priority Data
Mar. 16, 2010    (JP) .................................. 2010-059890

(51) Int. Cl.
*G06F 9/455* (2006.01)
*G06F 9/48* (2006.01)
*G06F 21/53* (2013.01)

(52) U.S. Cl.
CPC .......... *G06F 9/45533* (2013.01); *G06F 9/4843* (2013.01); *G06F 21/53* (2013.01); *G06F 2009/45562* (2013.01); *G06F 2009/45587* (2013.01)

(58) Field of Classification Search
None
See application file for complete search history.

(56) References Cited

U.S. PATENT DOCUMENTS 7,478,136 B2 *   1/2009   Yamada et al.  ............... 709/207
7,503,049 B2     3/2009   Kanemura et al.
(Continued)

FOREIGN PATENT DOCUMENTS

JP    2004-252629    9/2004
JP    2005-011336    1/2005
(Continued)

OTHER PUBLICATIONS

International Search Report issued Apr. 5, 2011 in International (PCT) Application No. PCT/JP2011/001343.
(Continued)

*Primary Examiner* — Camquy Truong
*Assistant Examiner* — Mehran Kamran
(74) *Attorney, Agent, or Firm* — Wenderoth, Lind & Ponack, L.L.P.

(57) ABSTRACT

A device (110) according to an implementation of the present invention, having a plurality of virtual machines (1002, 1003, 1004, and 1005), includes a virtualization software (1001) which manages the virtual machines. The virtualization software includes an application VM creating unit (1300) which creates a virtual machine for executing a program. A first virtual machine (1002) determines whether a first program is to be executed on the first virtual machine or to be executed on a virtual machine other than the first virtual machine. When the first virtual machine determines that the first program is to be executed on the other virtual machine, the application VM creating unit creates a second virtual machine for executing the first program.

13 Claims, 25 Drawing Sheets

(56) References Cited

U.S. PATENT DOCUMENTS

| | | | |
|---|---|---|---|
| 8,151,263 B1* | 4/2012 | Venkitachalam et al. | 718/1 |
| 8,185,893 B2* | 5/2012 | Hyser et al. | 718/1 |
| 8,296,759 B1* | 10/2012 | Hutchins et al. | 718/1 |
| 2003/0037105 A1 | 2/2003 | Yamada et al. | |
| 2005/0172294 A1* | 8/2005 | Kanemura et al. | 718/107 |
| 2006/0122962 A1* | 6/2006 | Ushiku | 707/1 |
| 2007/0089111 A1* | 4/2007 | Robinson et al. | 718/1 |
| 2008/0104608 A1* | 5/2008 | Hyser et al. | 718/105 |
| 2008/0134176 A1* | 6/2008 | Fitzgerald et al. | 718/1 |
| 2008/0163210 A1* | 7/2008 | Bowman et al. | 718/1 |
| 2009/0125901 A1 | 5/2009 | Swanson | |
| 2009/0125902 A1* | 5/2009 | Ghosh et al. | 718/1 |
| 2009/0172660 A1 | 7/2009 | Klotz, Jr. et al. | |
| 2009/0172781 A1* | 7/2009 | Masuoka et al. | 726/3 |
| 2009/0172820 A1* | 7/2009 | Watson | 726/26 |
| 2009/0193399 A1 | 7/2009 | Mitran et al. | |
| 2009/0313620 A1 | 12/2009 | Sedukhin et al. | |
| 2010/0017512 A1* | 1/2010 | Ciano et al. | 709/225 |
| 2010/0017592 A1* | 1/2010 | Yamada | 713/2 |
| 2010/0235828 A1* | 9/2010 | Nishimura et al. | 717/174 |
| 2011/0055714 A1* | 3/2011 | Vemulapalli et al. | 715/739 |
| 2011/0061050 A1* | 3/2011 | Sahita et al. | 718/1 |
| 2011/0138441 A1* | 6/2011 | Neystadt et al. | 726/1 |
| 2011/0191610 A1* | 8/2011 | Agarwal et al. | 713/310 |
| 2013/0055396 A1* | 2/2013 | Wang et al. | 726/24 |
| 2013/0290958 A1* | 10/2013 | Ansel | 718/1 |
| 2013/0346976 A1* | 12/2013 | Robinson et al. | 718/1 |

FOREIGN PATENT DOCUMENTS

| | | |
|---|---|---|
| JP | 2006-163840 | 6/2006 |
| JP | 2006-172463 | 6/2006 |
| JP | 2008-165795 | 7/2008 |
| WO | 2008/117411 | 10/2008 |

OTHER PUBLICATIONS

Takehiro Nakayama et al., "OSTI Technology for Open and Secure Mobile Terminals", NTT DoCoMo Technical Journal, vol. 15, No. 1, pp. 50-54, Apr. 1, 2007 (with its English version).

Hiroshi Yamada et al., "A VMM-level Approach to Shortening the downtime of Operating Systems' Reboots", IPSJ SIG Technical Reports, [CD-ROM], vol. 2009-OS-112, No. 2, Oct. 15, 2009, pp. 1-9.

"Open and Secure Terminal Initiative(OSTI), Architecture Specification, Revision 1.00", Intel Corporation and NTT DoCoMo, Inc., Oct. 16, 2006.

Extended European Search Report issued Nov. 13, 2014 in corresponding European Application No. 11755848.6.

* cited by examiner

| ID | Status | Memory | Destination for storing suspension state |
|---|---|---|---|
| 1 | Running | 0x52000 - 0x62000 | 0x10000 |
| .... | .... | .... | .... |
| n | Suspended | 0xA0000 - 0xB0000 | 0x10500 |

| Parent virtual machine ID | Child virtual machine ID |
|---|---|
| 1 | 3 |
| 1 | 4 |
| .... | .... |
| 2 | 5 |

| Function | Virtual machine ID |
|---|---|
| TV viewing | 1 |
| Phone call | 2 |
| .... | .... |
| Play back of commercial content | 0 |

| Function | Virtual machine 1 | Virtual machine 2 | ... | Virtual machine m |
|---|---|---|---|---|
| TV viewing | Yes | No | ... | No |
| ... | ... | ... | ... | ... |
| Play back of commercial content | No | Yes | ... | No |

1371

INFORMATION PROCESSING DEVICE, VIRTUAL MACHINE CREATION METHOD, AND APPLICATION DISTRIBUTION SYSTEM

TECHNICAL FIELD

The present invention relates to an information processing device, a virtual machine creation method, and an application distribution system which prevent unauthorized access to data.

BACKGROUND ART

Conventional TVs and cellular phones allow users to download application software (hereafter referred to as "application") so as to add a new function after the purchase of a device (a TV or cellular phone), and use the application software. Access by such an application to various resources in the device is limited conventionally. Here, examples of the resources in the device include position information such as GPS (Global Positioning System), and data generated by another application such as a dial function, an address book, a bookmark, and image data. However, in recent years, the access limitation has been eased to allow the development of a variety of applications, and devices which allow access to the position information and the data such as the dial function and the address book have become available. In the future, it is considered that devices which allow the users to install device driver software (hereafter referred to as "device driver") so as to add new hardware would become available.

Moreover, only the specific application development companies conventionally develop and distribute the applications. However, in recent years, a system is being developed in which general users can develop and distribute applications. In such a system, in order for the general users to easily develop applications, development tools generally used in a personal computer (hereafter referred to as "PC") are available for the development of applications, and debuggers can be connected to devices for sale.

At the same time, the leakage of data such as personal information stored in the PC, the cellular phone, or the like has become a problem. Especially in the PC, malicious software which is downloaded from an open network such as the Internet reads the data such as the personal information or the like stored in a storage device of the PC, and transmits the data to outside of the PC via the network despite a user's intention. Moreover, the malicious software causes a user to download the malicious software by making, with the use of an email or the like, the user believe that the malicious software itself is a useful software for the user, or by exploiting the vulnerability of software which operates on the PC.

In particular, a device driver can access data deployed by an application on a memory. For this reason, a device driver in a device to which the device driver can be installed accesses data that is undesirable to be disclosed to another application such as the personal information, and thus the device has a high risk of the leakage.

In such a manner, the downloaded application (hereafter referred to as "DL application") and the downloaded device driver (hereafter referred to as "DL device driver") can access many resources in the PC, the TV, and the cellular phone. Moreover, the general users can develop and distribute applications and device drivers, which increases the threat of attacks against the personal information stored in the device. Specifically, such a situation makes it easier for malicious attackers to develop and install attack applications (hereafter referred to as "malicious applications") and attack device drivers (hereafter referred to as "malicious device drivers"). This enables the malicious applications and the malicious device drivers to access information in the device, which increases the danger of the leakage and tampering of information.

There has conventionally been a method of separating execution environments in each of which a software is executed, as a method of protecting, from a DL application and a DL device driver, an original function of a device such as a telephone function in a cellular phone (see NPL 1, for example). NPL 1 discloses, as the method of separating execution environments, a method of separating execution environments using a CPU having a plurality of modes such as a normal mode and a secure mode, and a method of separating execution environments using a virtualization technology. FIG. 27 is a diagram showing the conventional method of separating execution environments using a virtualization technology which is disclosed by NPL 1.

In FIG. 27, a virtual machine 30 executes an operating system (hereafter referred to as "OS") and an application which are selected and developed by, for example, a telecommunications carrier of cellular phone. A virtual machine 40 executes applications for providing, by an enterprise other than the telecommunications carrier, a schedule and email service for workers of the enterprise. A virtualization software 20 provides, for the virtual machines 30 and 40, a virtual hardware function obtained by virtualizing a hardware 10. In addition, the virtualization software 20 controls the operations of the virtual machines 30 and 40.

The configuration shown in FIG. 27 makes it possible to separate the virtual machine 30 which provides a communication function that is the basic function of the cellular phone and the virtual machine 40 which provides the service for the workers, in addition to the OS.

Consequently, the malicious application or the malicious device driver does not influence the applications and the OS of the telecommunications carrier which operate on the virtual machine 30, even when, for example, the virtual machine 40 has a function which allows the user to freely download applications and device drivers and the malicious application or the malicious device driver operates on the virtual machine 40.

Furthermore, there is a method of dynamically creating a virtual machine using a VM creating device as a method of causing a virtual machine providing additional service for a device such as the virtual machine 40 to operate when needed (see PLT 1, for example). FIG. 28 is a block diagram showing a conventional virtual machine creating system described in PTL 1.

In FIG. 28, an OS 72 requests a VMM (virtual machine manager) 60 to create a virtual machine. As a result, a VM creating device 90 creates a virtual machine 80. Upon the creation, the virtual machine 80 becomes a copy of a virtual machine 70 at the time when the OS 72 requests the creation of the virtual machine.

CITATION LIST

Patent Literature

[PTL 1]
Japanese Unexamined Patent Application Publication No. 2008-165795
[PTL 2]
Japanese Unexamined Patent Application Publication No. 2005-011336

Non Patent Literature

[NPL 1]
Intel Corporation and NTT DoCoMo, Inc. "Open and Secure Terminal Initiative (OSTI) Architecture Specification Revision 1.00", Oct. 16, 2006

[NPL 2]
Okamoto, Tatsuaki and Hirosuke Yamamoto. *Gendai Angou*. Sangyou Tosho (1997)

[NPL 3]
ITU-T Recommendation X, 509 (August/2005): Information Technology—Open Systems Interconnection—The Directory: Authentication Framework, 2005

[NPL 4]
Kurosawa, Kaoru and Ogata Wakaha. *Gendai Angou No Kisosuuri*. Corona Publishing Co., Ltd (2004).

SUMMARY OF INVENTION

Technical Problem

However, with the conventional configurations, downloaded applications and device drivers operate in the same virtual machine. Thus, the conventional configurations do not make it possible to secure other downloaded applications when a malicious application or a malicious device driver is downloaded.

The present invention has been conceived to solve the conventional problem, and an object of the present invention is to provide an information processing device which makes it possible to prevent the malicious application or the malicious device driver from accessing information in the other applications.

Solution to Problem

In order to solve the conventional problem, an information processing device according to an aspect of the present invention is an information processing device which has a plurality of virtual machines and includes a virtual machine managing unit which manages the virtual machines. The virtual machine managing unit includes an application virtual machine (VM) creating unit which creates a virtual machine for executing a program. A first virtual machine determines whether a first program is to be executed on the first virtual machine or to be executed on a virtual machine other than the first virtual machine, the first virtual machine being one of the virtual machines, and the first program being executable on the first virtual machine. When the first virtual machine determines that the first program is to be executed on the other virtual machine, the application VM creating unit creates a second virtual machine for executing the first program.

With this configuration, the information processing device according to the aspect of the present invention creates a virtual machine independent of an application that may be an attack application (malicious application or malicious device driver) of a malicious attacker, and allows the virtual machine to execute the application. As a result, the information processing device successfully prevents the application from accessing the information held by other applications.

Moreover, when the first program is a program obtained from an other device, the first virtual machine may determine that the first program is to be executed on the other virtual machine.

With this configuration, the information processing device according to the aspect of the present invention successfully prevents the application that may be the malicious application or the malicious device driver and is obtained from the other device from accessing the information held by the other applications.

Moreover, when the first program includes a device driver software program obtained from an other device, the first virtual machine may determine that the first program is to be executed on the other virtual machine.

With this configuration, the information processing device according to the aspect of the present invention successfully prevents the malicious device driver from accessing the information held by the other applications.

Moreover, the information processing device may further include a storage unit which stores an operating system (OS) program for VM. The first virtual machine may further determine whether a second program is to be executed on the first virtual machine or to be executed on the other virtual machine, the second program being different from the first program and executable on the first virtual machine. The application VM creating unit may (i) create a third virtual machine for executing the second program, when the first virtual machine determines that the second program is to be executed on the other virtual machine, and (ii) create, using the OS program for VM, an operating system for the second virtual machine and an operating system for the third virtual machine.

With this configuration, the information processing device according to the aspect of the present invention is capable of using the common OS for the virtual machines. As a result, in comparison with a case where a different OS is used for each virtual machine, it is possible to reduce the capacity of the storage unit more.

Moreover, the second virtual machine may include an OS process requesting unit which sends, to the virtual machine managing unit, an OS process request for the other virtual machine to execute an OS process that is inexecutable on an operating system for the second virtual machine, and the virtual machine managing unit may further include an OS process request control unit which requests the other virtual machine to execute the OS process when the virtual machine managing unit receives the OS process request from the second virtual machine.

With this configuration, in the information processing device according to the aspect of the present invention, the virtual machine can request the other virtual machine to execute the process that the virtual machine cannot execute. Consequently, the function of the OS of each function can be eliminated, and thus a resource (e.g. memory) necessary for each virtual machine can be eliminated.

Moreover, the virtual machine managing unit may further include a parent and child relationship managing unit which manages a parent and child relationship of the virtual machines. The parent and child relationship managing unit may manage a parent and child relationship in which the first virtual machine that requests the creation of the second virtual machine is a parent and the second virtual machine created according to the request is a child. The OS process request control unit may request the first virtual machine to execute the OS process, when the virtual machine managing unit receives the OS process request from the second virtual machine, the first virtual machine being managed as the parent of the second virtual machine.

With this configuration, the information processing device according to the aspect of the present invention is capable of requesting the virtual machine to execute the OS process, the virtual machine being the "parent" of the virtual machine which has sent the OS process request.

Moreover, the virtual machine managing unit may further include a policy managing unit which determines, for each of functions achieved through the OS process request, whether or not it is possible to request the other virtual machine to execute an OS process corresponding to the function. The OS process request control unit may request the first virtual machine to execute the OS process, when the policy managing unit determines that it is possible to request the other virtual machine to execute the OS process.

With this configuration, the information processing device according to the aspect of the present invention successfully prevents the malicious application or the malicious device driver from accessing information held by other applications which achieve specific functions.

Moreover, the OS process requesting unit may (i) determine that the second virtual machine executes the OS process, when the first program includes the device driver software program obtained from the other device and the device driver software program can execute the OS process, and (ii) send the OS process request to the virtual machine managing unit when the device driver software program cannot execute the OS process.

With this configuration, the information processing device according to the aspect of the present invention can eliminate the function of the OS of each virtual machine, and can thus eliminate the resource (e.g. memory) necessary for each virtual machine.

It is to be noted that the present invention is realized not only as such an information processing device but also as a virtual machine creation method having, as steps, the characteristics units included in the information processing device and a program causing a computer to execute such characteristics steps. It goes without saying that such a program can be distributed via a recording medium such as a CD-ROM and a transmission medium such as the Internet.

Furthermore, the present invention can be realized not only as a semiconductor integrated circuit (LSI) which achieves part or all of the functions of the information processing device but also as an application distribution system including the information processing device.

Advantageous Effects of Invention

From the above, the present invention successfully provides the information processing device which prevents the malicious application or the malicious device driver from accessing the information in the other applications.

BRIEF DESCRIPTION OF DRAWINGS

FIG. 14 is a parent and child relationship management table according to Embodiment 1 of the present invention.

FIG. 15A is a policy table according to Embodiment 1 of the present invention.

FIG. 15B is a policy table according to Embodiment 1 of the present invention.

DESCRIPTION OF EMBODIMENTS

The following describes embodiments according to the present invention with reference to the drawings.

Embodiment 1

When a DL application or DL device driver is executed, an information processing device according to Embodiment 1 of the present invention creates a virtual machine for the DL application or DL device driver. Consequently, even if a program is a malicious application or a malicious device driver, the program is executed on the dedicated virtual machine, and thus the program cannot access information held by other programs. In this manner, the information processing device according to Embodiment 1 of the present invention prevents the malicious application or the malicious device driver from accessing the information held by the other applications.

<Configuration of Application Distribution System 100>

Figure 1:
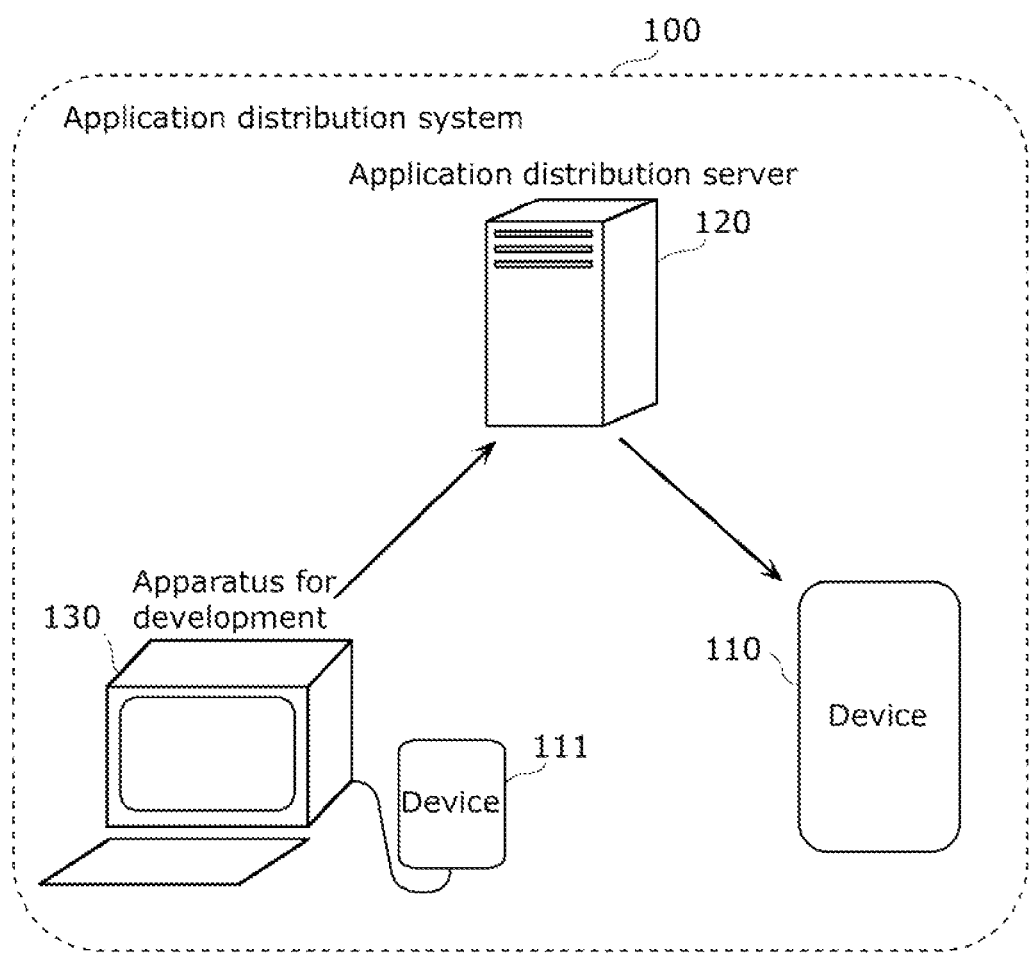
FIG. 1 is a schematic diagram showing a whole application distribution system according to Embodiment 1 of the present invention.

FIG. 1 is a schematic diagram showing an application distribution system 100 according to Embodiment 1 of the present invention.

The application distribution system 100 shown in FIG. 1 includes a device 110, an application distribution server 120, an apparatus for development 130, and a device 111.

The device 110 is, for instance, a cellular phone having a network communication function. The device 110 is connected to the application distribution server 120 via a network, and downloads an application from the application distribution server 120. Moreover, the device 110 which has downloaded the application obtains a new function by installing the application.

The application distribution server 120 is connected to the device 110 and the apparatus for development 130 via the network. The application distribution server 120 manages applications uploaded by the apparatus for development 130, and performs a process of downloading an application to the device 110.

The apparatus for development 130 is connected to the application distribution server 120 via the network, and is an apparatus for developing applications which operate on the device 110. Moreover, the apparatus for development 130 is connected to the device 111 via an interface compliant with the Universal Serial Bus (hereafter referred to as "USB") standards or the like. A developer develops an application using the apparatus for development 130, and performs a test to determine whether or not the application operates on the device 111 in an expected manner. When the test finds an error in the application, the developer debugs the application using the apparatus for development 130. Subsequently, uploading the application to the application distribution server 120 allows the device 110 to use the application. It is to be noted that the devices 110 and 111 are devices having the same functions, and only differ in being used by a general user (the device 110) or the developer (the device 111).

Moreover, the devices 110 and 111 correspond to the information processing device according to an implementation of the present invention.

<Software Configuration for Devices 110 and 111>

Figure 2:
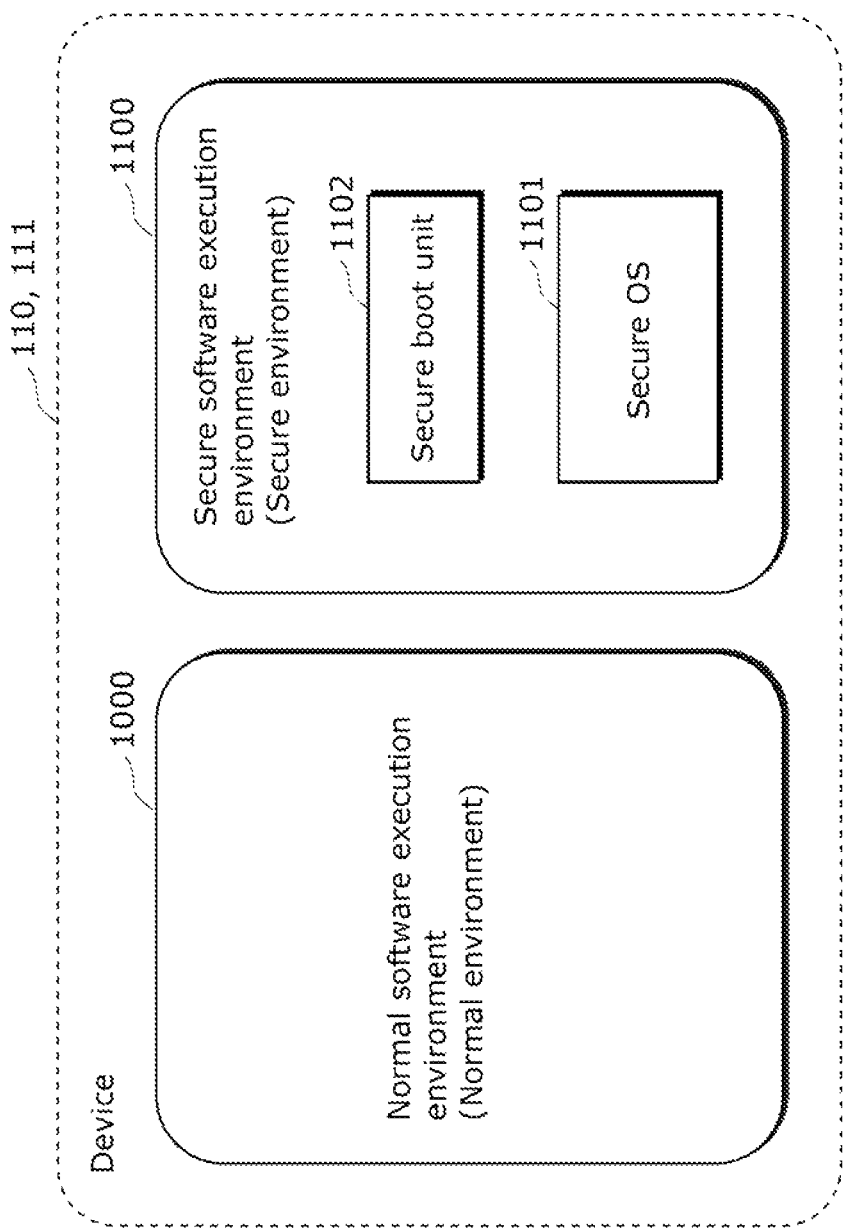
FIG. 2 is a software configuration diagram for devices according to Embodiment 1 of the present invention.

FIG. 2 is a software configuration diagram for the devices 110 and 111 according to Embodiment 1 of the present invention.

The devices 110 and 111 shown in FIG. 2 include a normal software execution environment (hereafter referred to as "normal environment") 1000 and a secure software execution environment (hereafter referred to as "secure environment") 1100. Each of the devices 110 and 111 executes a software (in the normal environment 1000 or secure environment 1100) by switching between the normal environment 1000 and the secure environment 1100.

The software in the secure environment 1100 includes a secure OS 1101 and a secure boot unit 1102. Here, the "secure OS" refers to a "secure operating system".

The secure OS 1101 manages the software in the secure environment 1100.

The secure boot unit 1102 performs secure boot when the devices 110 and 111 are powered on. The secure boot process is described later with reference to a flow chart.

The method disclosed by, for example, PLT 2 can be used as a method of switching between the normal environment 1000 and the secure environment 1100.

<Software Configuration for Normal Environment 1000>

Figure 3:
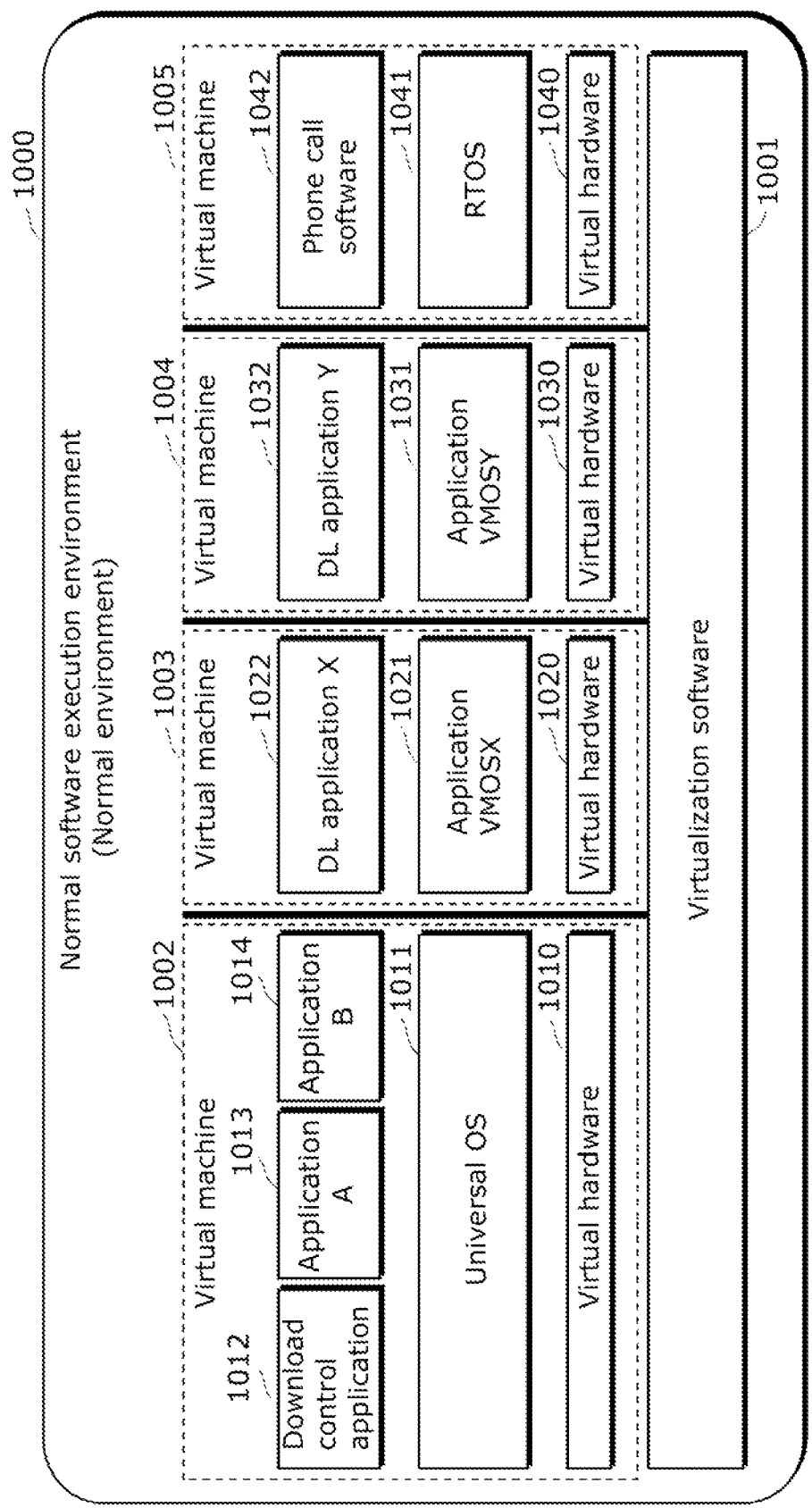
FIG. 3 is a schematic diagram showing a normal software execution environment according to Embodiment 1 of the present invention.

FIG. 3 is a software configuration diagram for the normal environment 1000 according to Embodiment 1 of the present invention.

The software in the normal environment 1000 shown in FIG. 3 includes a virtualization software 1001, and virtual machines 1002, 1003, 1004, and 1005.

The virtual machine 1002 includes a virtual hardware 1010, a universal OS 1011, a download control application 1012, an application A 1013, and an application B 1014. Moreover, the virtual machine 1003 includes a virtual hardware 1020, an application VMOSX 1021, and a DL application X 1022. Furthermore, the virtual machine 1004 includes a virtual hardware 1030, an application VMOSY 1031, and a DL application Y 1032. Moreover, the virtual machine 1005 includes a virtual hardware 1040, a RTOS 1041, and a phone call software 1042. Here, the "universal OS", the "application VMOS", the "DL application", and the "RTOS" are a "universal operating system", an "application VM operating system", a "downloaded application", and a "real-time operating system", respectively. In addition, the "VM" stands for "Virtual Machine".

The virtualization software 1001 functions to: control the virtual machines 1002 to 1005 operating thereon; allocate hardware resources such as a memory and a CPU to the virtual machines 1002 to 1005 and manage the hardware resources; access devices according to requests from the virtual machines 1002 to 1005; and schedule the virtual machines 1002 to 1005. The virtualization software 1001 corresponds to a virtual machine managing unit according to an implementation of the present invention.

The virtual machines 1002 to 1005 include the virtual hardwares, OSs, and applications, and are executed by the virtualization software 1001 independently from each other. Moreover, the virtual machines 1002 to 1005 are independent of each other, and there is no data transfer or exchange of instructions directly between the virtual machines. In other words, the data transfer or the exchange of the instructions between the virtual machines is always performed through the virtualization software 1001.

Each of the virtual hardwares 1010, 1020, 1030, and 1040 virtually provides a hardware function to a corresponding one of the virtual machines. Moreover, each of the virtual hardwares 1010, 1020, 1030, and 1040 includes an IPL (Initial Program Loader) and a BIOS (Basic Input/Output System). It is to be noted that each of the virtual hardwares 1010, 1020, 1030, and 1040 may be integrated into the virtualization software 1001 or the OS of the corresponding one of the virtual machines, depending on the configuration of the virtualization software 1001.

The universal OS 1011 loads applications (applications A 1013 and B 1014) into a memory and executes the applications, or deletes (unloads) an application (application A 1013 or B 1014) from the memory.

Furthermore, the universal OS 1011 requests the virtualization software 1001 to execute DL applications (DL application X 1022 and DL application Y 1032).

Moreover, the universal OS 1011 provides a network communication function for the download control application 1012 and the applications A 1013 and B 1014.

The download control application 1012 communicates with the application distribution server 120 connected to the device 110 via the Internet, and downloads and installs applications to the device 110.

The applications A 1013 and B 1014 have functions such as an address management function, a web browse function, and an e-mail function, and provide these functions for the user.

In Embodiment 1 of the present invention, the DL applications are downloaded from the application distribution server 120 by the download control application 1012 operating on the universal OS 1011, and stored in the device 110. Subsequently, when the universal OS 1011 requests the virtualization software 1001 to execute the DL applications, the virtualization software 1001 performs setting so that each of the DL applications operates on one of the virtual machines. Consequently, the DL application is executed on the virtual machine.

It is to be noted that although Embodiment 1 of the present invention describes a case where the DL applications X 1022 and Y 1032 are downloaded from the application distribution server 120 and executed, the present invention is not limited to the case. In addition, the number of the virtual machines is not limited to 4. In other words, when the universal OS 1011 requests the virtualization software 1001 to execute the DL applications, 4 or more virtual machines may be created, or when the RTOS 1041 requests the virtualization software 1001 to execute the DL applications, such virtual machines may be created.

Each of the applications VMOSX 1021 and VMOSY 1031 is an OS operating on a virtual machine which operates a DL application. The application VMOSX 1021 has a function necessary for the DL application X 1022 to operate. The application VMOSY 1031 has a function necessary for the DL application Y 1032 to operate. It is to be noted that details of the applications VMOSX 1021 and VMOSY 1031 are described later.

Each of the DL applications X 1022 and Y 1032 is an application downloaded from the application distribution server 120. Like the applications A 1013 and B 1014, the DL applications X 1022 and Y 1032 provide various functions for the user.

The RTOS 1041 is an OS for operating software providing basic functions of the device.

The phone call software 1042 provides a phone call function that is one of basic functions of the devices 110 and 111.

It is to be noted that although the virtualization software 1001 performs setting so that each DL application operates on one of the virtual machines, the present invention is not limited to this. For instance, the virtualization software 1001 may perform setting so that each of applications (applications A 1013 and B 1014) not yet downloaded from the application distribution server 120 operates on one of the virtual machines or part of the DL applications operates on the universal OS 1011.

It is to be noted that the applications VMOSX 1021 and VMOSY 1031 may have different functions or the same functions. In addition, the applications VMOSX 1021 and VMOSY 1031 may have the same functions as the universal OS 1011.

<Hardware Configuration for Devices 110 and 111>

Figure 4:
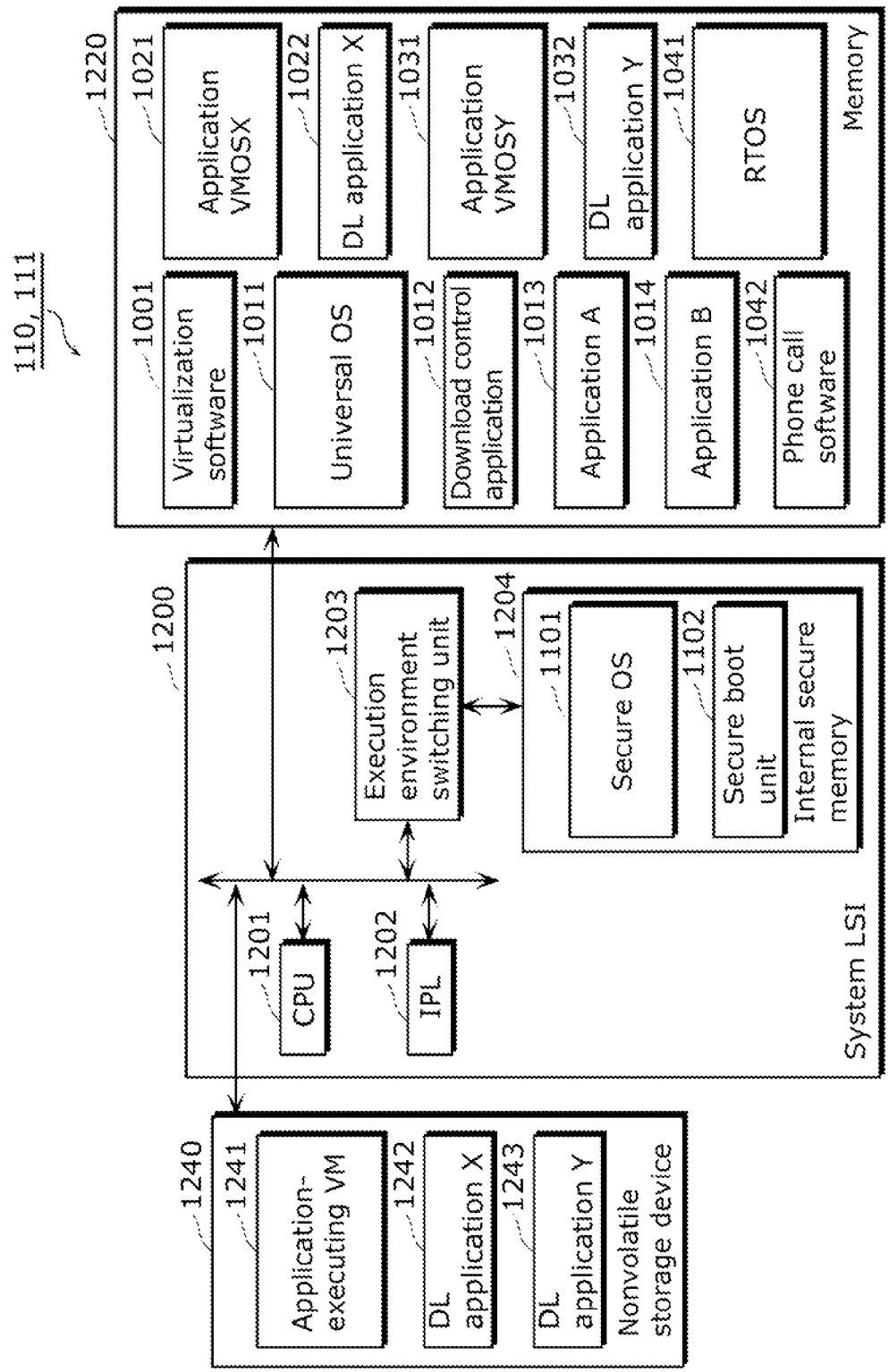
FIG. 4 is a hardware configuration diagram of each of devices according to Embodiment 1 of the present invention.

FIG. 4 is a hardware configuration diagram for each of the devices 110 and 111 according to Embodiment 1 of the present invention.

The elements in FIGS. 2 and 3 correspond to elements stored in an internal secure memory 1204 and a memory 1220 shown in FIG. 4. Each of functions is implemented by executing, on a CPU 1201, software for implementing each of the elements.

Each of the devices 110 and 111 shown in FIG. 4 includes a system LSI 1200, a nonvolatile memory device 1240, and the memory 1220. The system LSI 1200 is connected to the nonvolatile memory device 1240 and the memory 1220 via external buses.

The system LSI 1200 includes the CPU 1201, an IPL 1202, an execution environment switching unit 1203, and the internal secure memory 1204. It is to be noted that details of the system LSI 1200 are described later.

The memory 1220 stores the virtualization software 1001, the universal OS 1011, the download control application 1012, the applications A 1013 and B 1014, the application VMOSX 1021, the DL application X 1022, the application VMOSY 1031, the DL application Y 1032, the RTOS 1041, and the phone call software 1042. This shows a situation where each element shown in FIG. 3 is loaded into the memory 1220.

The nonvolatile memory device 1240 stores the application-executing VM 1241 and the DL applications X 1242 and Y 1243.

Although not shown, the nonvolatile memory device 1240 stores softwares to be stored in the memory 1220 and the internal secure memory 1204. Furthermore, the nonvolatile memory device 1240 may store applications other than the applications A 1013 and B 1014 and the DL applications X 1242 and Y 1243.

The softwares which are encrypted with predetermined keys and are to be stored in the internal secure memory 1204 are stored in the nonvolatile memory device 1240. The softwares are stored in the nonvolatile memory device 1240 at the time of factory manufacturing of the devices 110 or 111. Moreover, the softwares are deployed from the nonvolatile memory device 1240 to the memory 1220 and the internal secure memory 1204 at the time of system start-up or at the time of request for application start-up.

It is to be noted that the keys for encrypting the softwares to be stored in the internal secure memory 1204 may be the same for all the devices or may differ for the respective system LSIs 1200 or the softwares. Moreover, keys for decrypting the encrypted softwares may be stored in a key storage unit (not shown) in the system LSI 1200, or the softwares which are encrypted with keys stored in the system LSI 1200 may be stored in the nonvolatile memory device 1240.

Although each of the devices 110 and 111 further includes, for example, an input and output unit not shown in FIG. 4, a description of the input and output unit and so on is omitted as they do not constitute the essence of the present invention. In addition, although the system LSI 1200 includes, for example, a peripheral circuit not shown in FIG. 4, a description of the peripheral circuit and so on is omitted as they do not constitute the essence of the present invention.

<Configuration of System LSI 1200>

The following describes in detail each of the elements in the system LSI 1200 according to Embodiment 1 of the present invention.

The CPU 1201 controls operations of the entire device 110 or 111 by executing instruction codes in, for example, the softwares stored in the memory 1220 and the internal secure memory 1204. Moreover, the CPU 1201 has two modes, a privileged mode and a non-privileged mode, as operation modes. The universal OS 1011 operates in the privileged mode, and the download control application 1012 and the applications A 1013 and B 1014 operate in the non-privileged mode.

The IPL 1202 is a software which starts first when the device 110 or 111 is powered on. The IPL 1202 starts the secure OS 1101 deployed in the internal secure memory 1204 and the virtualization software 1001 deployed in the memory 1220, when the device 110 or 111 is powered on. The IPL 1202 is stored in a mask ROM provided in the system LSI 1200.

The execution environment switching unit 1203 switches between the normal environment 1000 and the secure environment 1100 of the system LSI 1200. The execution environment switching unit 1203 performs access control so that the internal secure memory 1204 is accessible from the CPU 1201 or the like only when the execution environment of the system LSI 1200 is the secure environment.

The internal secure memory 1204 stores the secure OS 1101 and the secure boot unit 1102.

It is to be noted that the system LSI 1200 may further include a nonvolatile secure memory (not shown). The execution environment switching unit 1203 performs access control on the nonvolatile secure memory so that the nonvolatile secure memory is accessible from the CPU 1201 or the like only when the execution environment of the system LSI 1200 is the secure environment. It is to be noted that the nonvolatile secure memory may store the softwares to be stored in the internal secure memory 1204 or the keys for decrypting the encrypted softwares.

<Configuration of Application Distribution Server 120>

Figure 5:
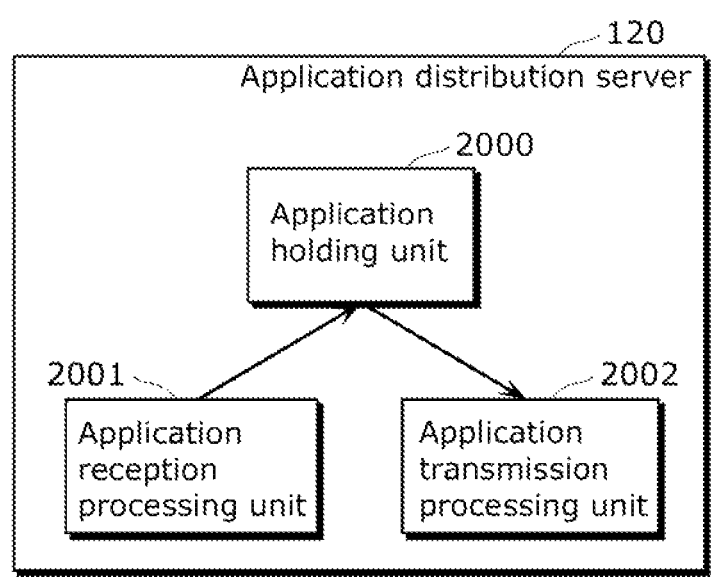
FIG. 5 is a block diagram showing an application distribution server according to Embodiment 1 of the present invention.

FIG. 5 is a schematic diagram showing the application distribution server 120 according to Embodiment 1 of the present invention.

The application distribution server 120 shown in FIG. 5 includes an application holding unit 2000, an application reception processing unit 2001, and an application transmission processing unit 2002.

The application holding unit 2000 holds applications managed by the application distribution server 120.

The application reception processing unit 2001 communicates with the apparatus for development 130 connected via the network, to receive applications uploaded by the apparatus for development 130. Moreover, the application reception processing unit 2001 transmits the received applications to the application holding unit 2000, and requests the application holding unit 2000 to hold and manage the transmitted applications.

The application transmission processing unit 2002 communicates with the device 110 connected via the network. The application transmission processing unit 2002 obtains, from the application holding unit 2000, applications requested by the device 110, and transmits the requested applications to the device 110. Moreover, the application transmission processing unit 2002 creates a list of applications held in the application holding unit 2000, and transmits the created list to the device 110.

<Configuration of Apparatus for Development 130>

Figure 6:
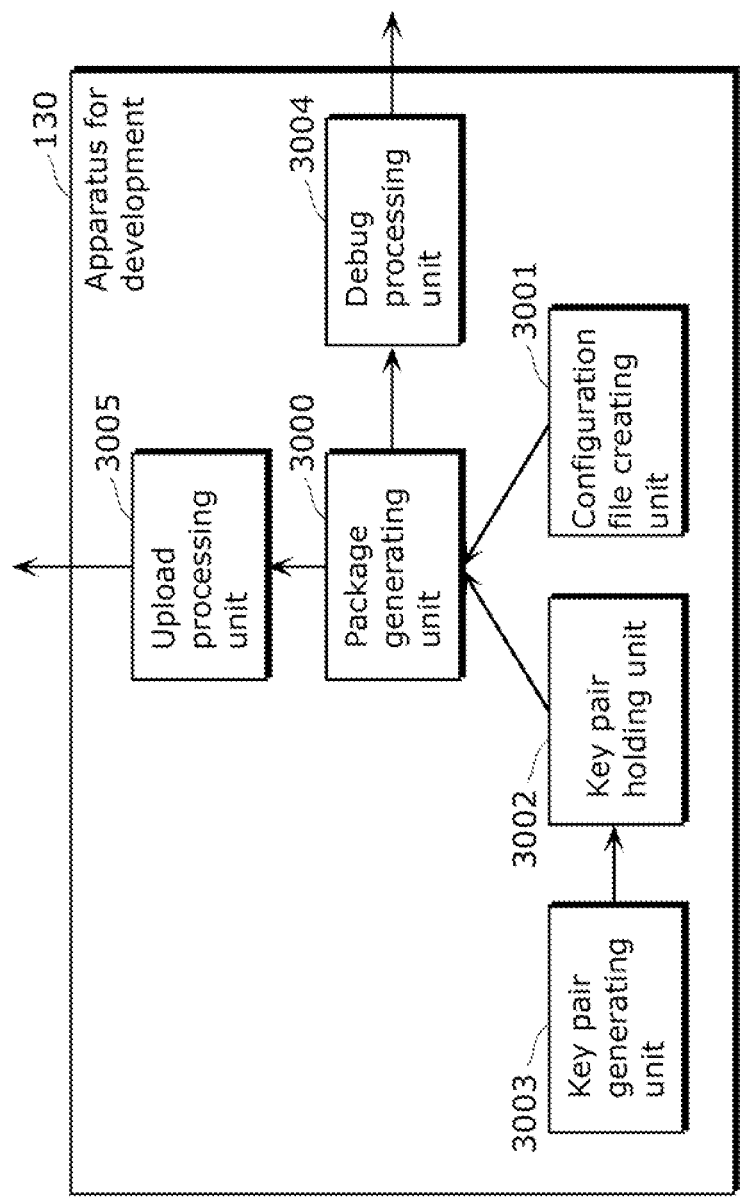
FIG. 6 is a block diagram showing a development environment according to Embodiment 1 of the present invention.

FIG. 6 is a block diagram showing the apparatus for development 130 according to Embodiment 1 of the present invention.

The apparatus for development 130 shown in FIG. 6 includes a package generating unit 3000, a configuration file creating unit 3001, a key pair holding unit 3002, a key pair generating unit 3003, a debug processing unit 3004, and an upload processing unit 3005.

The package generating unit 3000 creates an application by compiling source codes developed by a developer. Then, the package generating unit 3000 generates a package file in which an application signature (Signature), a configuration file, and a public key certificate (Certificate) are added to the created application. As an example, a signature scheme using the RSA method can be used for the application signature scheme. It is to be noted that details of the above are described later.

It is to be noted that the application signature (digital signature) scheme is not limited to the RSA method, and other signature schemes may be used. For instance, NPL 2 describes, on pages 171 to 188, the other signature schemes in detail. Moreover, NPL 3 describes the public key certificate in detail.

The configuration file creating unit 3001 creates the configuration file to be added to the application. The configuration file includes various information items such as information indicating which resource of a device the application is to use, information about the developer of the application, and information indicating what kind of service the application provides for other applications. The configuration file creating unit 3001 creates the information items based on values set by the application developer.

The key pair holding unit 3002 holds keys (a key pair of a private key and a public key in a public-key cryptosystem) for use in generating and verifying the application signature to be added to the package. For example, the key pair holding unit 3002 holds the public key in a format of the public key certificate described in NPL 3 (ITU-T Recommendation X. 509).

The key pair generating unit 3003 generates the key pair of the private key and the public key in the public-key cryptosystem, and holds the generated key pair in the key pair holding unit 3002.

It is to be noted that NPL 2 describes in detail the public-key cryptosystem on pages 107 to 130.

The debug processing unit 3004 communicates with the device 111 connected to the apparatus for development 130 through a USB or the like, and performs a process of debugging an application developed by the developer. Examples of the process of debugging include a process of installing an application by using a generated package, a process of executing an installed application, a process of setting a breakpoint, and a process of obtaining a log output.

The upload processing unit 3005 communicates with the application distribution server 120 connected to the apparatus for development 130 via the network, and performs a process of uploading, to the application distribution server 120, the package generated by the package generating unit 3000.

<Configuration of Package Generating Unit 3000>

Figure 7:
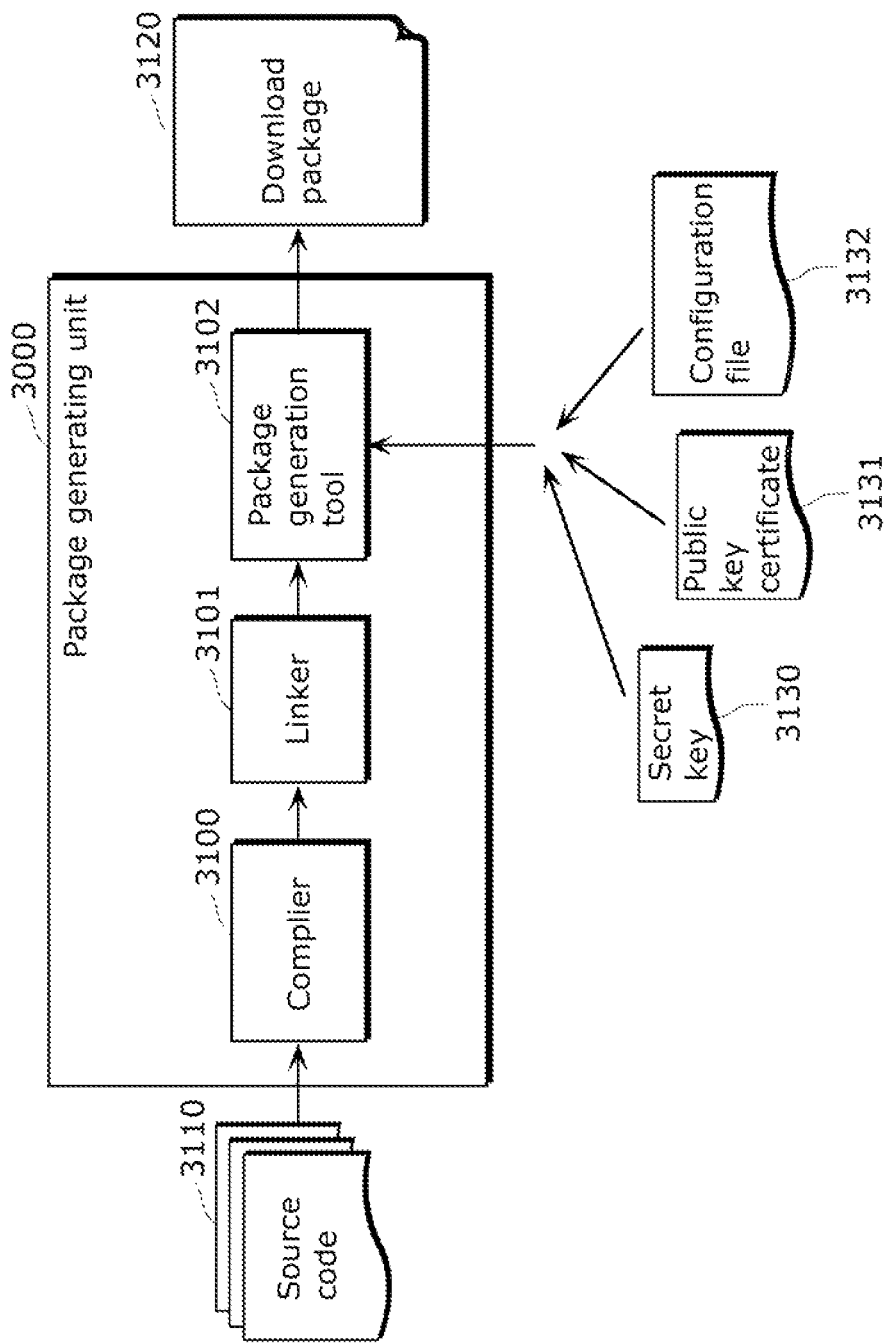
FIG. 7 is a block diagram showing a package generating unit according to Embodiment 1 of the present invention.

FIG. 7 is a block diagram showing the package generating unit 3000 according to Embodiment 1 of the present invention.

The package generating unit 3000 shown in FIG. 7 includes a compiler 3100, a linker 3101, and a package generation tool 3102.

The compiler 3100 creates an object file by compiling inputted source codes 3110.

The linker 3101 creates a file (executable file) that can be executed by the devices 110 and 111, by linking the object file created by the compiler 3100 and a library.

The package generation tool 3102 generates a download package 3120 using the executable file created by the linker 3101, a configuration file 3132 created by the configuration file creating unit 3001, and a private key 3130 and a public key certificate 3131 held in the key pair holding unit 3002.

<Structure of Download Package 3120>

Figure 8:
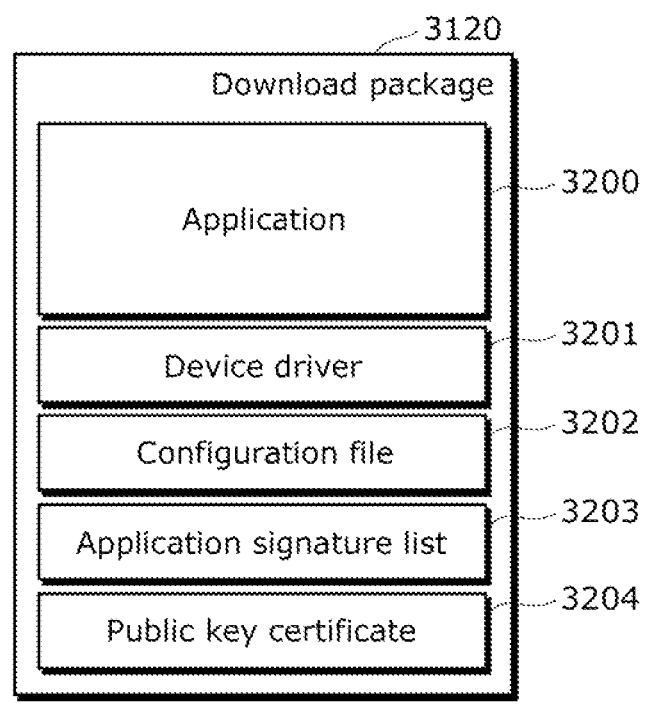
FIG. 8 is a diagram showing a download application package according to Embodiment 1 of the present invention.

FIG. 8 is a diagram showing the download package 3120 according to Embodiment 1 of the present invention.

In FIG. 8, the download package 3120 includes an application 3200, a device driver 3201, a configuration file 3202, an application signature list 3203, and a public key certificate 3204.

The application 3200 and the device driver 3201 are executable files created by the compiler 3100 and the linker 3101 from the source codes 3110 developed by the developer.

The configuration file 3202 is the same as the configuration file 3132 inputted to the package generation tool 3102.

The application signature list 3203 is a list including signatures of the application 3200, the device driver 3201, and the configuration file 3202. The package generation tool 3102 generates the signatures from the application 3200, the device driver 3201, and the configuration file 3202 that are inputted at the time of generating the download package 3120, and creates the application signature list 3203. The private key 3130 is used by the application signature list 3203 to generate the signatures.

The public key certificate 3204 is the same as the public key certificate 3131 inputted to the package generation tool 3102.

It is to be noted that although the download package 3120 includes, as a file, each of the application 3200, the device driver 3201, the configuration file 3202, the application signature list 3203, and the public key certificate 3204, the present invention is not limited to this. For instance, each of the files may be one or plural in number. Moreover, part of the files may be included in the download package 3120. Furthermore, the files may be downloaded in one file as the download package 3120, may be separately downloaded, or may be downloaded after being divided into files.

It is to be noted that the application signature list 3203 may include a signature for the entire list including the signatures of the application 3200, the device driver 3201, and the configuration file 3202. Moreover, the download package 3120 may include the signatures of the application signature list 3203.

<Secure Boot Process>

The devices 110 and 111 verify, at the time of their start-up, whether or not the virtualization software 1001 and a software operating in the secure environment 1100 have been tampered with.

Figure 9:
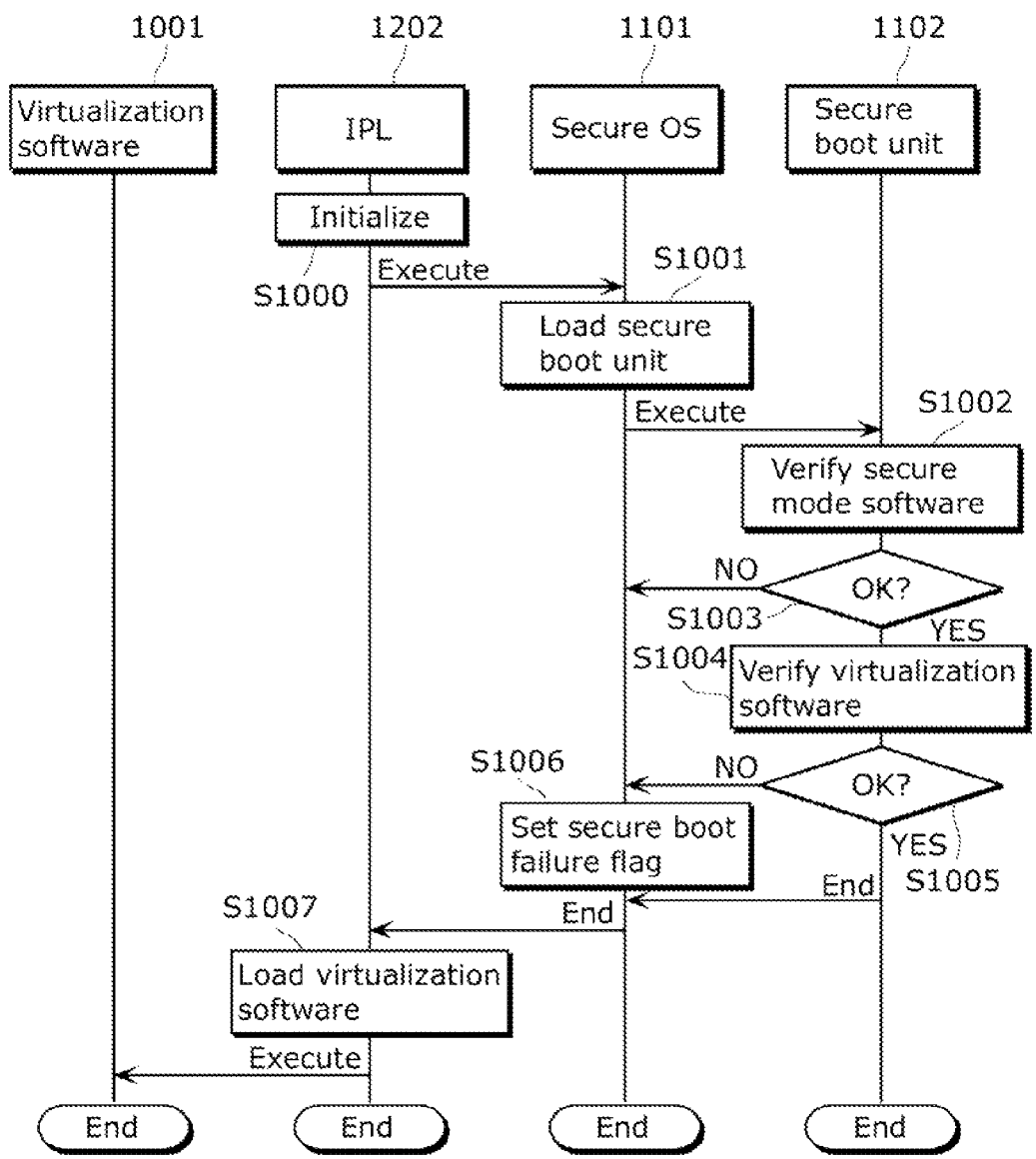
FIG. 9 is a flow chart for secure boot according to Embodiment 1 of the present invention.

The following describes a method (secure boot process) from when the devices 110 and 111 are powered on to when the virtualization software 1001 starts, with reference to a flow chart shown in FIG. 9.

When powered on, the device 110 or 111 starts the IPL 1202 in the system LSI 1200.

The IPL 1202 first performs an initialization process on hardware of the device 110 or 111 (S1000). In the initialization, process, the following processes are performed: operation check on the memory 1220, initialization of the execution environment switching unit 1203, initialization of the peripheral circuit (not shown), and so on. Subsequently, the secure OS 1101 is started.

The secure OS 1101 performs initialization of the secure environment 1100 (implementation of a secure software execution environment), thereby allowing an application to operate in the secure environment 1100. Subsequently, the secure OS 1101 loads the secure boot unit 1102 (S1001), and starts the secure boot unit 1102.

Here, the secure boot unit 1102 is stored in encrypted state in the nonvolatile memory device 1240. Thus, the execution environment switching unit 1203 decrypts the encrypted secure boot unit 1102 using a key unique to the system LSI 1200, and loads the decrypted secure boot unit 1102 to the internal secure memory 1204.

The secure boot unit 1102 verifies the secure OS 1101 and the secure boot unit 1102 (S1002). As a verification method, the secure boot unit 1102 verifies whether or not the secure OS 1101 and the secure boot unit 1102 have been tampered with, by generating a hash value of a software and comparing the generated hash value with a pre-calculated reference hash value. Here, the reference hash value is calculated before factory shipment, and is embedded in the secure boot unit 1102. Moreover, the secure boot unit 1102 is encrypted with the reference hash value embedded, and stored in the nonvolatile memory device 1240.

It is to be noted that although the hash value is used in the verification method for software here, the present invention is not limited to this. A method in which a signature is used instead of the hash value may be employed. Here, the secure boot unit 1102 may be encrypted with a public key for use in signature verification embedded, and stored in the nonvolatile memory device 1240. The public key may be stored in the nonvolatile memory device 1240 separately from the secure boot unit 1102. Moreover, the secure boot unit 1102 may obtain the public key from another apparatus outside the device.

When the secure boot unit 1102 determines that the secure OS 1101 and the secure boot unit 1102 have not been tampered with, based on a result of the verification of the secure OS 1101 and the secure boot unit 1102 in step S1002, the secure boot unit 1102 determines YES in step S1003, and the flow proceeds to step S1004. Moreover, when the secure boot unit 1102 determines that one of the secure OS 1101 and the secure boot unit 1102 has been tampered with, based on the result of the verification of the secure OS 1101 and the secure boot unit 1102 in step S1002, the secure boot unit 1102 determines NO in step S1003, and the flow proceeds to step S1006.

When the secure boot unit 1102 determines YES in step S1003, the secure boot unit 1102 verifies the virtualization software 1001 (S1004). For instance, the secure boot unit 1102 employs the same verification method as in step S1002.

When the secure boot unit 1102 determines that the virtualization software 1001 has not been tampered with, based on a result of the verification of the virtualization software 1001 in step S1004, the secure boot unit 1102 determines YES in step S1005, ends the process, and returns the process to the secure OS 1101. In contrast, when the secure boot unit 1102 determines that the virtualization software 1001 has been tampered with, based on the result of the verification in step S1004, the secure boot unit 1102 determines NO in step S1005, and the flow transits to step S1006.

When the secure boot unit 1102 determines NO in either step S1003 or step S1005, the secure boot unit 1102 sets a secure boot failure flag (S1006). The secure boot failure flag is data stored in a specific area of the internal secure memory 1204 (not shown). The secure OS 1101 and an application which operates on the secure OS 1101 recognize a state of the device 110 or 111 by checking the secure boot failure flag, and determine whether to operate or not.

After the end of the process in step S1006, the secure boot unit 1102 returns the process to the secure OS 1101.

When the process is returned from the secure boot unit 1102, the secure OS 1101 returns the process to the IPL 1202.

The IPL 1202 loads, to the memory 1220, the virtualization software 1001 stored in the nonvolatile memory device 1240 (S1007), and executes (starts) the virtualization software 1001.

It is to be noted that secure boot which is defined by the MPWG (Mobile Phone Work Group) of the TCG (Trusted Computing Group) may be employed in the secure boot process.

Moreover, here, although the verification of the secure mode software (S1002) is followed by the verification of the virtualization software (S1004), the present invention is not limited to this. For example, after the secure boot unit 1102 performs the verification of the secure mode software (S1002), the secure boot unit 1102 may temporarily return the process to the IPL 1202, and the IPL 1202 may successively request, via the secure OS 1101, the verification of the virtualization software (S1004) from the secure boot unit 1102.

Furthermore, although the secure boot process ends when the virtualization software 1001 is executed, the present invention is not limited to this. A scope of the secure boot process may include an IPL, an OS, and an application in a virtual machine. In the case where the scope of the secure boot process includes the IPL, the OS, and the application, each of the IPL, the OS, and the application verifies whether or not a software to be started next has been tampered with, and then starts (executes) the software to be started next.

<Start Process of Virtual Machine>

The virtualization software 1001 starts a predetermined virtual machine at the time of device startup. In addition, the virtualization software 1001 newly creates a virtual machine in response to a request from a running virtual machine.

Figure 10:
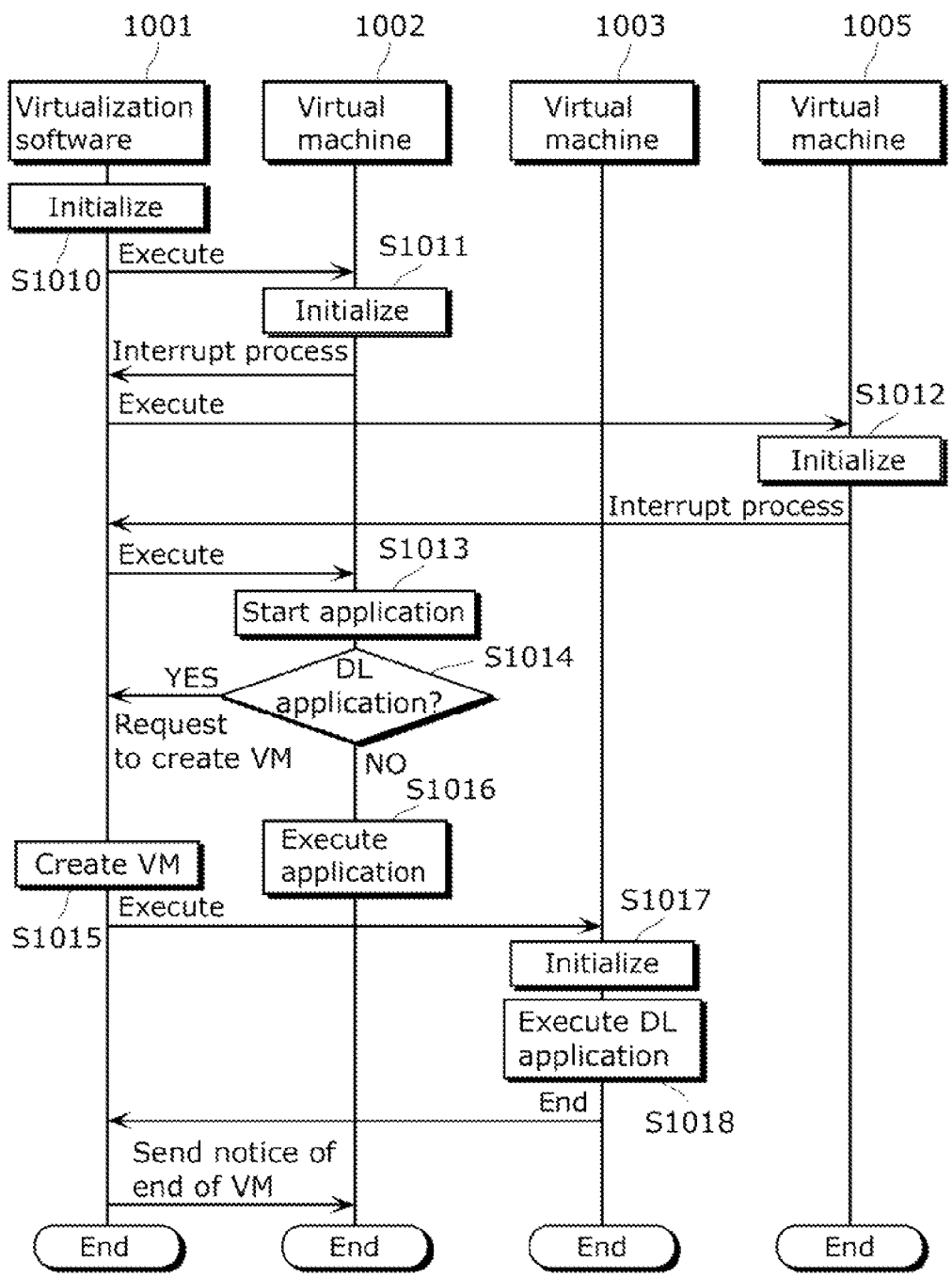
FIG. 10 is a flow chart for virtual machine start-up according to Embodiment 1 of the present invention.

The following describes a process in which each of virtual machines starts after a start of the virtualization software 1001 with reference to a flow chart shown in FIG. 10.

The virtualization software 1001 is started by the IPL 1202 at the end of the secure boot process, and performs an initialization process (S1010). After the initialization process, the virtualization software 1001 reserves hardware resources such as a memory for executing the virtual machine 1002, and then starts the virtual machine 1002.

When started, the virtual machine 1002 first performs an initialization process (S1011). The virtual machine 1002 executes the IPL 1202 in the virtual hardware 1010 as the initialization process. Moreover, the virtual machine 1002 loads the universal OS 1011 to the memory, and executes the universal OS 1011. Subsequently, during or after a start process of the universal OS 1011, a process request from the virtual machine 1002 to the virtualization software 1001 or hardware interrupt aborts a process of the virtual machine 1002, and the process is returned to the virtualization software 1001.

Next, the virtualization software 1001 reserves hardware resources such as a memory for executing the virtual machine 1005, and starts the virtual machine 1005.

When started, the virtual machine 1005 first performs an initialization process (S1012). The virtual machine 1005 executes the IPL 1202 in the virtual hardware 1040 as the initialization process. Moreover, the virtual machine 1005 loads the RTOS 1041 to the memory, and executes the RTOS 1041. Subsequently, during or after a start process of the RTOS 1041, a process request from the virtual machine 1005 to the virtualization software 1001 or hardware interrupt aborts a process of the virtual machine 1005, and the process is returned to the virtualization software 1001.

Then, the virtualization software 1001 schedules each virtual machine according to a scheduling function.

When the virtual machine 1002 is executed according to the scheduling function, the virtual machine 1002 starts the application based on a request from the user using the device (S1013).

At the time of starting the application, the virtual machine 1002 determines whether the application of which start has been requested is to be operated by the virtual machine 1002 or another virtual machine. Specifically, the virtual machine 1002 determines whether or not the application of which start has been requested is a DL application (S1014). It is to be noted that the DL application is not limited to an application downloaded from another apparatus via the network, and may be an application obtained from still another apparatus. For instance, the DL application may be an application which the device 110 obtains via a recording medium detachable to the device 110 after shipment. Alternatively, the virtual machine 1002 may determine whether or not the application of which start has been requested is a DL device driver.

When the application is the DL application, the virtual machine 1002 determines "YES", and when the application is not the DL application, the virtual machine 1002 determines "NO". For example, the virtual machine 1002 uses an extension assigned to a file name of the application of which start has been requested, for the determination of the DL application.

When the virtual machine 1002 determines "YES" in step S1014, the virtual machine 1002 requests the virtualization software 1001 to create a VM (application VM) for executing the application of which start has been requested.

The virtualization software 1001 creates the virtual machine 1003 for executing DL application (S1015), and starts the virtual machine 1003. Details of the VM creation process are described later with reference to a flow chart.

When started, the virtual machine 1003 performs an initialization process (S1017), and executes the application of which start has been requested (S1018). Moreover, during the execution of the DL application (S1018), a process request from the virtual machine 1003 to the virtualization software 1001 or hardware interrupt may abort a process of the virtual machine 1003, and the process may be returned to the virtualization software 1001. In this case, when the virtual machine 1003 is rescheduled, the virtual machine 1003 executes the aborted process according to the scheduling function of the virtualization software 1001. When the application ends, the virtual machine 1003 sends notice of an end of the virtual machine to the virtualization software 1001.

Upon receiving the notice of the end from the virtual machine 1003, the virtualization software 1001 sends notice of the end of the VM to the virtual machine 1002.

Upon receiving the notice of the end of the VM, the virtual machine 1002 recognizes that the application of which start was requested in step S1013 has ended.

On the other hand, when the virtual machine 1002 determines "NO" in step S1014, the virtual machine 1002 executes the application of which start has been requested (S1016).

As stated above, each of the devices 110 and 111 according to Embodiment 1 of the present invention starts the predetermined virtual machine at the time of the start of a corresponding one of the devices 110 and 111. Furthermore, when the user requests the started predetermined virtual machine to start the DL application, each of the devices 110 and 111 additionally starts a virtual machine for DL application (virtual machine 1003), and executes the DL application in the virtual machine.

It is to be noted that when the virtual machine 1002 requests creation of another VM for executing DL application, during the abortion of the process of the virtual machine 1003, the virtualization software 1001 creates a virtual machine (e.g. virtual machine 1004) other than the virtual machine 1003, and allows the DL applications to be operated on the different virtual machines, respectively.

<Configuration of Virtualization Software 1001>

Figure 11:
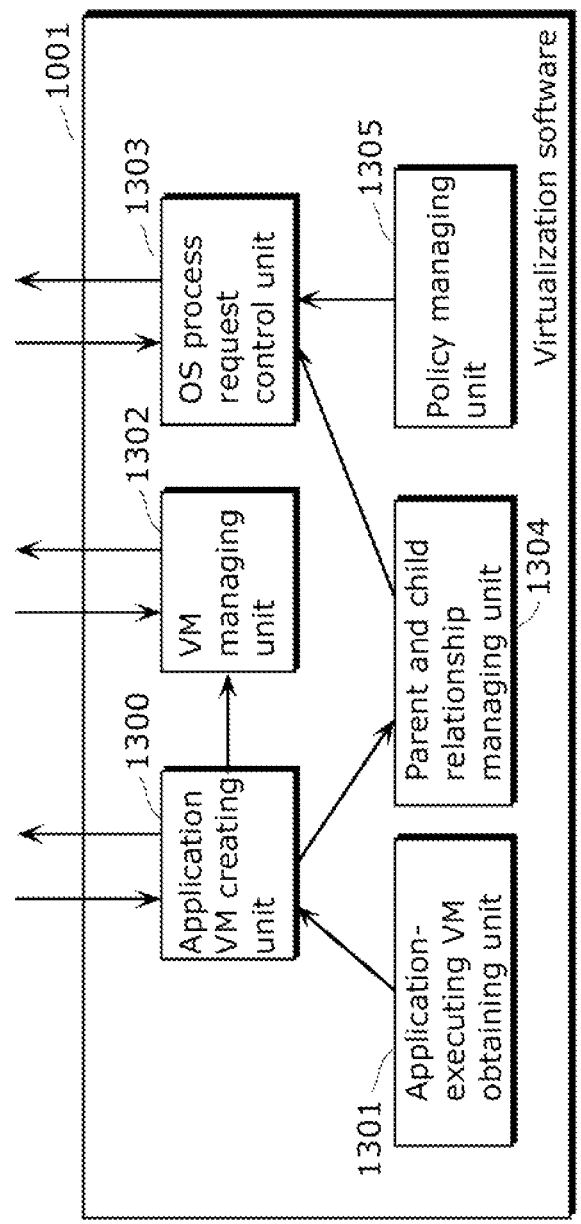
FIG. 11 is a block diagram showing a virtualization software according to Embodiment 1 of the present invention.

FIG. 11 is a software configuration diagram showing the virtualization software 1001 according to Embodiment 1 of the present invention.

In FIG. 11, the virtualization software 1001 includes an application VM creating unit 1300, an application-executing VM obtaining unit 1301, a VM managing unit 1302, an OS process request control unit 1303, a parent and child relationship managing unit 1304, and a policy managing unit 1305.

Upon receiving a request to create a virtual machine (application VM) from a virtual machine operating on the virtualization software 1001, the application VM creating unit 1300 creates a virtual machine (application VM) for executing DL application. Here, the application VM creating unit 1300 creates the virtual machine (application VM) according to an application-executing VM and a DL application transmitted from a virtual machine. Moreover, the application VM creating unit 1300 requests the VM managing unit 1302 to manage the created virtual machine. Furthermore, the application VM creating unit 1300 registers, in the parent and child, relationship managing unit 1304, the virtual machine which has requested the creation of the virtual machine as a "parent", and the created virtual machine as a "child". It is to be noted that details of the VM creation process are described later with reference to a flow chart.

Moreover, here, although the application VM creating unit 1300 creates the virtual machine for executing DL application, based on the application-executing VM and the DL application transmitted from the virtual machine, the present invention is not limited to this. For example, the application VM creating unit 1300 may download, from the application distribution server 120, a virtual machine including an application, an OS, and a virtual hardware, perform a process of loading the virtual machine, and request management from the VM managing unit 1302. Moreover, the application VM creating unit 1300 may create the virtual machine not at the time of executing the DL application but at the time of downloading the DL application from the application distribution server 120.

The application-executing VM obtaining unit 1301 reads the application-executing VM 1241 stored in the nonvolatile memory device 1240.

Figures 12, 13:
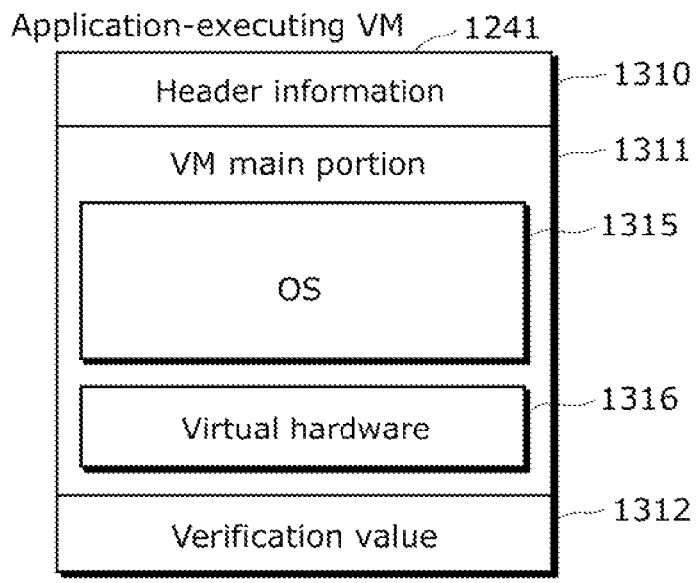
FIG. 12 is a diagram showing an application-executing VM according to Embodiment 1 of the present invention.
FIG. 13 is a virtual machine management table according to Embodiment 1 of the present invention.

FIG. 12 is a diagram showing the structure of the application-executing VM 1241 according to Embodiment 1 of the present invention. The application-executing VM 1241 includes header information 1310, a VM main portion 1311, and a verification value 1312. The VM main portion 1311 includes an OS 1315 and a virtual hardware 1316. The header information 1310 includes an address (logical address) for writing an application to be executed, and an address (logical address) of a management structure which manages device drivers. The verification value 1312 is a hash value that is obtained when the VM main portion 1311 is inputted into a hash function. The OS 1315 corresponds to an OS for VM according to an implementation of the present invention, and the nonvolatile memory device 1240 corresponds to a storage unit according to an implementation of the present invention.

It is to be noted that the verification value 1312 may be not behind of the VM main portion 1311 but ahead of the VM main portion 1311, or may be included in the header information 1310. Furthermore, the verification value 1312 may be not included in the application-executing VM 1241 but stored, in association with the application-executing VM 1241, in the nonvolatile secure memory separately from the application-executing VM 1241.

It is to be noted that an algorithm such as MD4, MD5, SHA-1 (Secure Hash Algorithm-1), and SHA-2 can be used as the hash function. Moreover, the verification value 1312 may be not the hash value but a digital signature, a MAC (Message Authentication Code) value, an error-detecting code value, or an error-correcting code value. For example, CBC-MAC (Cipher Block Chaining Message Authentication Code) and HMAC (Keyed-Hashing for Message Authentication Code) can be used as an algorithm for calculating the MAC value. Moreover, for example, CRC (Cyclic Redundancy Check) and a checksum can be used as an algorithm for calculating the error-detecting code value. Furthermore, for example, Reed-Solomon codes and Turbo codes can be used as an algorithm for calculating the error-correcting code value.

It is to be noted that NPL 4 describes in detail hash functions on pages 96 to 105, and Message Authentication Code on pages 30 to 39, and that NPL 2 describes in detail digital signature schemes on pages 171 to 188.

It is to be noted that application-executing VMs 1241 may be stored in the nonvolatile memory device 1240, and the application-executing VM obtaining unit 1301 may switch between the application-executing VMs 1241 to be used, depending on a DL application. Here, the header information 1310 of each of the application-executing VMs 1241 may include information which indicates functions of the application-executing VM 1241 or information which associates the application-executing VM 1241 with the DL application.

The VM managing unit 1302 manages virtual machines which are operating on the virtualization software 1001. The VM managing unit 1302 manages a virtual machine which starts at the time of device startup, together with a VM for executing DL application. Moreover, the VM managing unit 1302 uses a virtual machine management table 1350 shown in FIG. 13, for the management of the virtual machines. The virtual machine management table 1350 includes a virtual machine ID for identifying a virtual machine, a status of a virtual machine, an address range of a memory used by a virtual machine, and a destination for storing a suspension state at the time of suspending a virtual machine.

Upon receiving an OS process request from the virtual machine operating on the virtualization software 1001, the OS process request control unit 1303 requests a virtual machine that is a "parent" of the requesting virtual machine to execute the OS process. The OS process request control unit 1303 obtains, from the parent and child relationship managing unit 1304, information about the "parent" virtual machine. It is to be noted that details of the OS request process are described later with reference to a flow chart.

The parent and child relationship managing unit 1304 manages the parent and child relationship between the virtual machines based on notice from the application VM creating unit 1300. The parent and child relationship managing unit 1304 manages the parent and child relationship using a parent and child relationship management table 1360. FIG. 14 shows a structure of the parent and child relationship management table 1360. The parent and child relationship management table 1360 includes an ID of a "parent" virtual machine (parent virtual machine ID) and an ID of a "child" virtual machine (child virtual machine ID). Moreover, each of the parent virtual machine ID and the child virtual machine ID corresponds to one of the IDs in the virtual machine management table 1350.

The policy managing unit 1305 determines, for each of functions achieved through the OS process request, whether or not it is possible to request another virtual machine to execute the OS process for the function. Specifically, when receiving the OS process request from the virtual machine, the policy managing unit 1305 determines whether or not to execute the OS process, based on a policy table 1370. As shown in FIG. 15A, the policy table 1370 includes functions and virtual machine IDs. All functions of devices are listed in the function column, and virtual machine IDs each corresponding to one of the functions are listed in the virtual machine ID column. Here, regarding a function which cannot be used by a DL application, a special ID indicating use prohibition ("0" in FIG. 15A) is stored as a virtual machine ID.

It is to be noted that the policy table may be as shown in FIG. 15B. A policy table 1371 shown in FIG. 15B includes functions, and symbols each indicating whether or not one of virtual machines is permitted to access one of the functions. "Yes" in FIG. 15B indicates access granted, and "No" in FIG. 15B indicates access denied.

Although a policy is determined for each virtual machine here, the present invention is not limited to this. The policy may be determined for each DL application. In this case, information for associating a DL application with a virtual machine is added to the virtual machine management table 1350.

Although TV viewing, phone call, and play back of commercial content are shown as examples of the functions in FIGS. 15A and 15B, the functions are not limited to these. For instance, to determine whether or not to send a process request to a device driver, the policy managing unit 1305 may store, into the policy table 1370 or 1371, information indicating whether or not use is prohibited for each device driver. Moreover, the policy managing unit 1305 may store, into the policy table 1370 or 1371, information indicating whether or not use is prohibited for each inner function of an OS such as a memory handling function. Furthermore, the policy managing unit 1305 may store, into the policy table 1370 or 1371, information obtained by combining the above information items.

Moreover, because an OS process request among OS process requests from a virtual machine is not essentially received for a process to be executed inside an application VMOS, use by a DL application may be prohibited when such a process request is received. Examples of the process to be executed inside the application VMOS include a process of installing a downloaded device driver, a process of executing a downloaded device driver, and a process concerning a function relevant to a memory map. It is to be noted that details of the above are described later.

<Configuration of Universal OS 1011>

Figure 16:
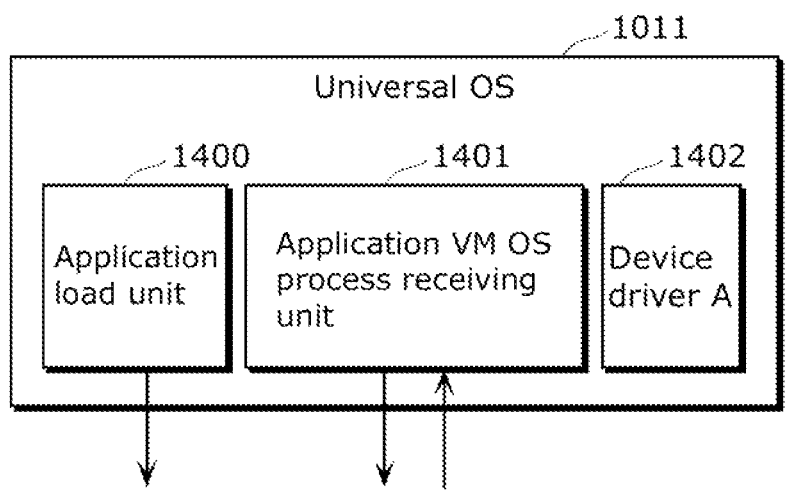
FIG. 16 is a block diagram showing a universal OS according to Embodiment 1 of the present invention.

FIG. 16 is a block diagram showing the universal OS 1011 according to Embodiment 1 of the present invention.

In FIG. 16, the universal OS 1011 includes an application load unit 1400, an application VM OS process receiving unit 1401, and a device driver A 1402.

Upon receiving, from the user, a request to start an application, the application load unit 1400 performs an application start process. The application load unit 1400 determines whether or not the application of which start has been requested by the user is a DL application. When the application of which start has been requested by the user is the DL application, the application load unit 1400 requests the virtualization software 1001 to create an application VM. When the application of which start has been requested by the user is not the DL application but a normal application, the application load unit 1400 executes the application as an application operating on the universal OS 1011.

Upon receiving the OS process request from the virtualization software 1001, the application VM OS process receiving unit 1401 executes the requested OS process, and notifies the virtualization software 1001 of the result of the executed OS process. The application VM OS process receiving unit 1401 receives, from the virtualization software 1001, an identifier and a parameter for the OS process to be executed, and execute the process according to the identifier. Moreover, the application VM OS process receiving unit 1401 registers a callback function for the virtualization software 1001 during the initialization process for the universal OS 1011, and receives an OS process request using the callback function.

It is to be noted that although the application VM OS process receiving unit 1401 receives the OS process request via the callback function, the present invention is not limited to this. The present invention includes a mechanism which may cause the virtualization software 1001 to send the request to the universal OS 1011. For example, as a virtual hardware function, the application VM OS process receiving unit 1401 may receive the OS process request through interrupt processing dedicated for OS process request. Moreover, the application VM OS process receiving unit 1401 may add a system call dedicated for OS process request to the system call of the universal OS 1011, and receive the OS process request via the system call.

The device driver A1402 manages access to a hardware attached to the device 110 or 111. The device driver A 1402 operates according to a request from an application which operates in and on the universal OS 1011.

<Configuration of Application Load Unit 1400>

Figure 17A:
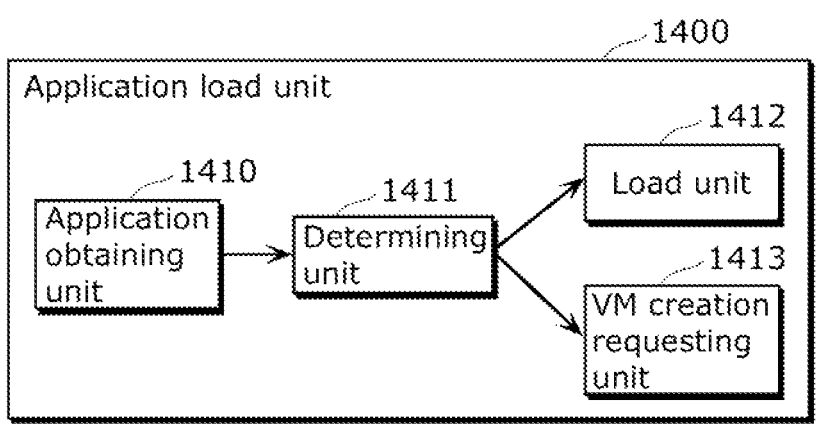
FIG. 17A is a block diagram showing an application load unit according to Embodiment 1 of the present invention.

FIG. 17A is a block diagram showing the application load unit 1400 according to Embodiment 1 of the present invention.

The application load unit 1400 shown by FIG. 17 includes an application obtaining unit 1410, a determining unit 1411, a load unit 1412, and a VM creation requesting unit 1413.

The application obtaining unit 1410 reads, from the non-volatile memory device 1240, an application of which start has been requested by the user.

The determining unit 1411 determines whether or not the application of which start has been requested by the user is a DL application. When the application of which start has been requested by the user is not the DL application, the determining unit 1411 requests the load unit 1412 to load and start the application. When the application of which start has been requested by the user is the DL application, the determining unit 1411 requests the VM creation requesting unit 1413 to start the DL application.

As a method of determining a DL application, for example, the determining unit 1411 determines whether or not an extension assigned to a file name of the application of which start has been requested matches a predetermined extension by comparing the extensions. An extension (predetermined extension) used by the DL application is determined at the time of system design, embedded in the universal OS 1011 in advance, and used for the comparison.

It is to be noted that although the determining unit 1411 uses the extension for the determination of the DL application, the present invention is not limited to this. For instance, the DL application may be stored in a specific directory (folder), and the determining unit 1411 may determine whether or not a name of a directory (name of a folder) of the application of which start has been requested matches a name of the directory in which the DL application is stored, by comparing the names. Moreover, information (identifier) for indicating a DL application may be embedded in header information of the DL application, and the determining unit 1411 may check whether or not the information exists. Furthermore, the determining unit 1411 may determine whether the application is the DL application by using information in the public key certificate 3204 in the download package 3120 of the DL application. Examples of such a determining method include a method of determining whether or not information for identifying a subject or issuer is information indicating a specific enterprise, and a method of checking whether a certificate serial number is composed of a specific character string. Moreover, a DL application managing unit which manages DL applications downloaded from the application distribution server 120 may be provided, and the determining unit 1411 may determine whether the application of which start has been requested is the DL application depending on whether or not the application is an application managed by the DL application managing unit.

The load unit 1412 writes, into the memory 1220, the application read by the application obtaining unit 1410, performs processes necessary for starting the application (e.g. analysis of header, setting of logical address, setting of stack, and setting of entry point), and then executes the application.

Upon receiving the request to start the DL application from the determining unit 1411, the VM creation requesting unit 1413 requests the virtualization software 1001 to create an application VM. Moreover, at the time of the request, the VM creation requesting unit 1413 transmits, to the virtualization software 1001, the DL application to be executed on the application VM.

Figure 17B:
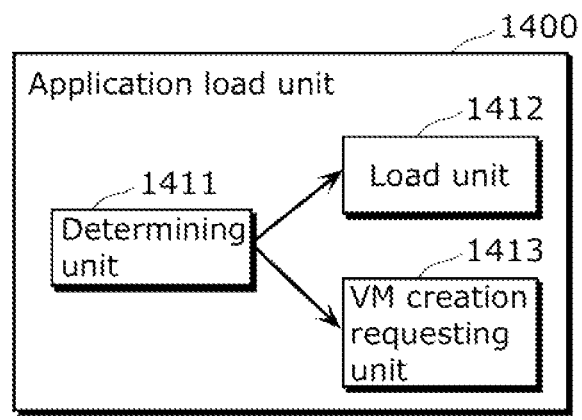
FIG. 17B is a block diagram showing an application load unit according to Embodiment 1 of the present invention.

It is to be noted that as shown by FIG. 17B, the application load unit 1400 may include only the determining unit 1411, the load unit 1412, and the VM creation requesting unit 1413. In this case, the functions of the application obtaining unit 1410 may be included in the determining unit 1411, or may be included in the application VM creating unit 1300 and the load unit 1412 of the virtualization software 1001.

<Configurations of Application VMOSX 1021 and Application VMOSY 1031>

Figure 18A:
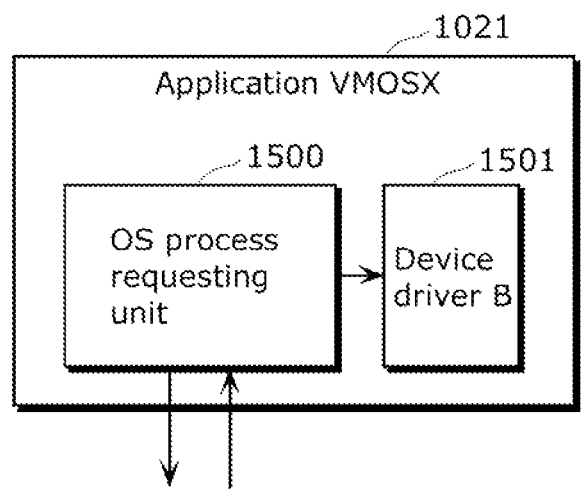
FIG. 18A is a block diagram showing an application VMOSX according to Embodiment 1 of the present invention.
Figure 18B:
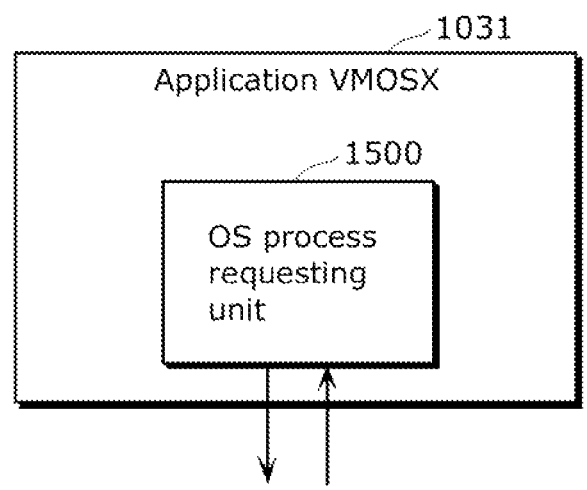
FIG. 18B is a block diagram showing an application VMOSY according to Embodiment 1 of the present invention.

Each of FIGS. 18A and 18B is a block diagram showing an application VMOS according to Embodiment 1 of the present invention. FIG. 18A is the block diagram showing the configuration of the application VMOSX 1021, and FIG. 18B is the block diagram showing the configuration of the application VMOSY 1031.

The application VMOSX 1021 shown by FIG. 18A includes an OS process requesting unit 1500 and a device driver B 1501.

Upon receiving an OS process request from the DL application X 1022 operating on the application VMOSX 1021, the OS process requesting unit 1500 requests the virtualization software 1001 to execute the OS process. Here, when the OS process request is a process request for the device driver B 1501, the process request is sent not to the virtualization software 1001 but directly to the device driver B 1501 from within the application VMOSX 1021.

The device driver B 1501 is a device driver operating within the application VMOSX 1021, and is used not by other applications but by only the DL application X 1022.

The application VMOSY 1031 shown by FIG. 18B includes the OS process requesting unit 1500.

It is to be noted that although the device driver B 1501 is used not by the other applications but by only the DL application X 1022, the present invention is not limited to this. For instance, the DL application Y 1032 may use the device driver B 1501. In this case, the application VMOSY 1031 further includes the device driver B 1501. The DL application Y 1032 uses the device driver B 1501 included in the application VMOSY 1031.

Upon receiving an OS process request from the DL application X 1032 operating on the application VMOSX 1031, the OS process requesting unit 1500 requests the virtualization software 1001 to execute the OS process. Since the application VMOSY 1031 has no device driver inside, the OS process requesting unit 1500 requests the virtualization software 1001 to execute all OS process.

<Configuration of OS Process Requesting Unit 1500>

Figure 19A:
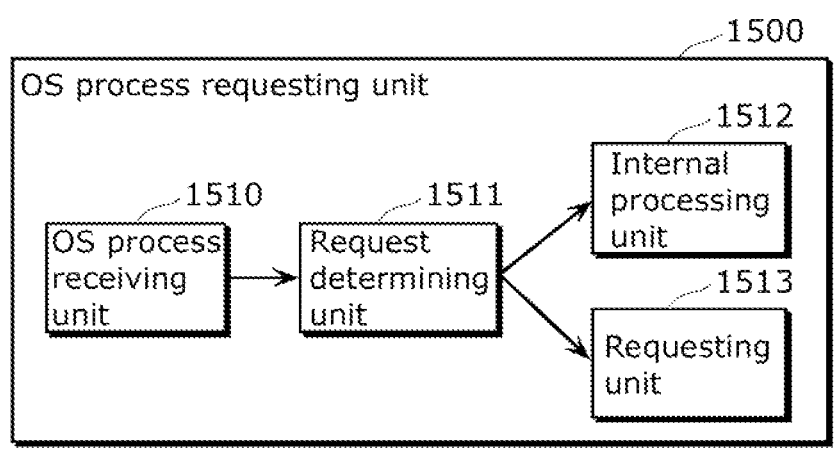
FIG. 19A is a block diagram showing an OS process requesting unit according to Embodiment 1 of the present invention.

FIG. 19A is a block diagram showing the OS process requesting unit 1500 according to Embodiment 1 of the present invention.

The OS process requesting unit 1500 shown by FIG. 19A includes an OS process receiving unit 1510, a request determining unit 1511, an internal processing unit 1512, and a requesting unit 1513.

The OS process receiving unit 1510 receives an OS process request from a DL application.

The request determining unit 1511 determines whether the requested OS process is a process to be executed within an application VMOS or a process to be requested to the virtualization software 1001. When determining that the requested OS process is the process to be executed internally, the request determining unit 1511 requests the internal processing unit 1512 to execute the process. Moreover, when determining that the requested OS process is the process to be requested to the virtualization software 1001, the request determining unit 1511 requests the requesting unit 1513 to execute the process.

The internal processing unit 1512 calls the process requested by the DL application, and feeds back the processing result to the DL application.

The requesting unit 1513 requests the virtualization software 1001 to execute the OS process. Moreover, the requesting unit 1513 feeds back, to the DL application, a result obtained from the virtualization software 1001.

Examples of a process determined by the request determining unit 1511 as the process to be executed inside the application VMOS include the process of installing a downloaded device driver, the process of executing a downloaded device driver, and the process concerning a function relevant to a memory map.

Figure 19B:
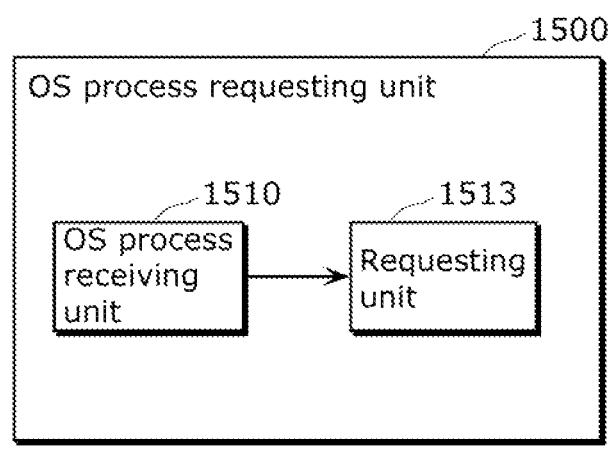
FIG. 19B is a block diagram showing an OS process requesting unit according to Embodiment 1 of the present invention.

It is to be noted that the OS process requesting unit 1500 determines whether or not the OS process request is the process to be executed internally, the present invention is not limited to this. Like the OS process requesting unit 1500 shown by FIG. 19B, the virtualization software 1001 may be requested to execute all processes without determining whether or not each requested OS process is the process to be executed internally.

<Application VM Creation Process>

The universal OS 1011 and the virtualization software 1001 perform an application VM creation process so that the universal OS 1011 and the virtualization software 1001 cause a DL application to operate on an application VMOS in cooperation with each other.

Figure 20:
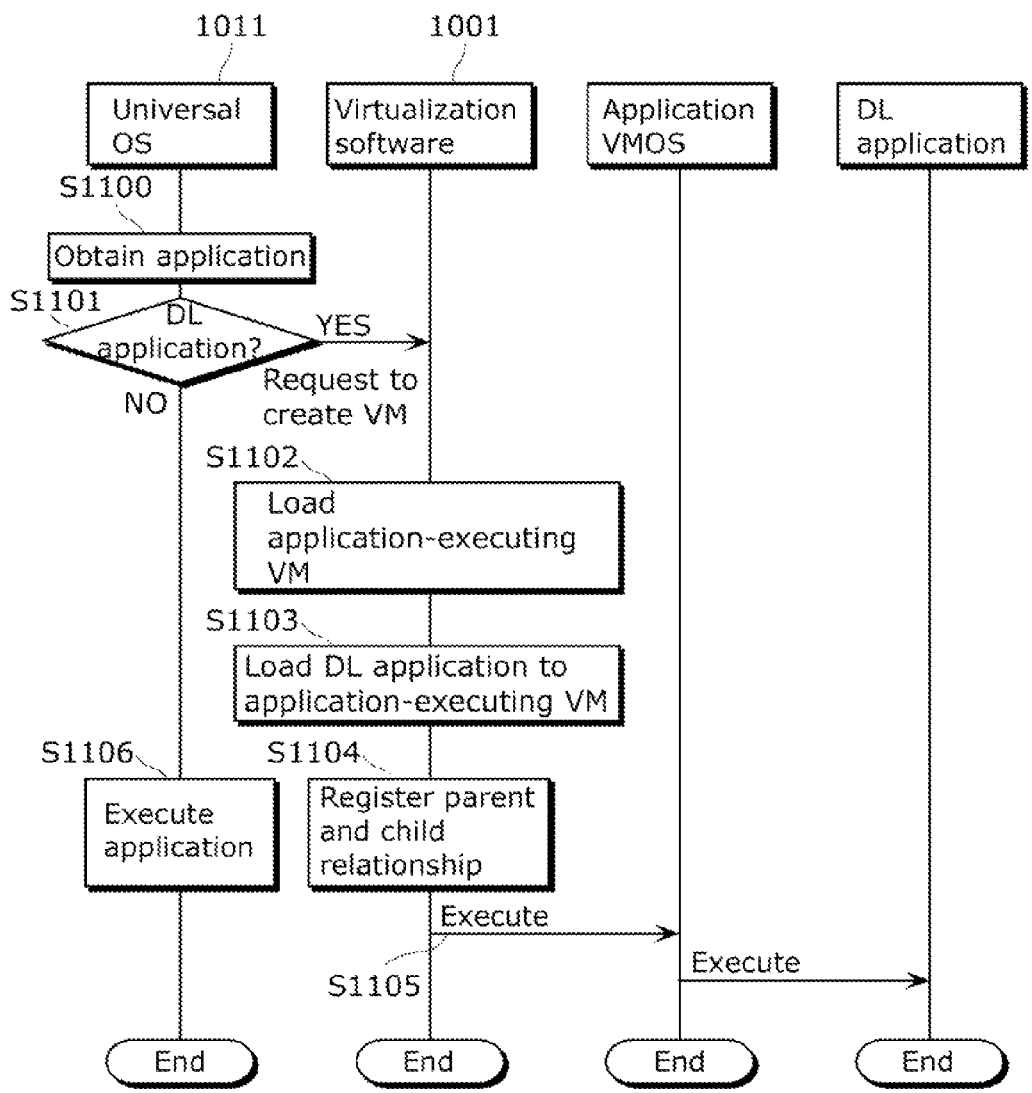
FIG. 20 is a flow chart for application VM generation processing according to Embodiment 1 of the present invention.

The following describes an application VM creation process at the time when the universal OS 1011 requests the virtualization software 1001 to create an application VM, with reference to a flow chart shown in FIG. 20.

In response to an application execution request from the user, the universal OS 1011 performs an application start process. First, the application load unit 1400 of the universal OS 1011 obtains the application of which execution has been requested, from the nonvolatile memory device 1240 (S1100), and writes the obtained application into the memory 1220.

The application load unit 1400 determines whether or not the obtained application is a DL application (S1101). When the obtained application is the DL application, the application load unit 1400 determines "YES", and when the obtained application is not the DL application, the application load unit 1400 determines "NO".

When the application load unit 1400 determines "YES" in step S1101, the application load unit 1400 requests the virtualization software 1001 to create a VM (application VM) for executing the application of which execution has been requested. Here, the application load unit 1400 sends, to the virtualization software 1001, the obtained application together with the request.

Upon receiving the application VM creation request, the application VM creating unit 1300 of the virtualization software 1001 reserves, on the memory 1220, a memory area for an application VM to be created, reads the application-executing VM 1241 from the nonvolatile memory device 1240, and writes the VM main portion 1311 into the reserved memory area (S1102). Subsequently, the application VM creating unit 1300 generates a verification value from the written VM main portion 1311 so as to verify whether the correct VM main portion 1311 is written. Next, the application VM creating unit 1300 compares the generated verification value with the verification value 1312 of the application-executing VM 1241, and verifies whether or not the verification values match each other. When the generated verification value does not match the verification value 1312 of the application-executing VM 1241, the application VM creating unit 1300 stops creating the application VM.

It is to be noted that although the application VM creating unit 1300 verifies the verification value 1312 after writing the VM main portion 1311 into the memory 1220, the present invention is not limited to this. For instance, the application VM creating unit 1300 may calculate a verification value of the VM main portion 1311 before reading the application-executing VM 1241 from the nonvolatile memory device 1240, and verify whether or not the calculated verification value matches the verification value 1312.

Moreover, when the application VM creating unit 1300 creates virtual machines for respective DL applications, the application VM creating unit 1300 uses the OS 1315 in common. For example, the application VM creating unit 1300 creates, using the OS 1315, both the application VMOSX 1021 of the virtual machine 1003 which executes the DL application X 1022 and the application VMOSY 1031 of the virtual machine 1004 which executes the DL application Y 1032. Specifically, when both the DL application X 1022 and the DL application Y 1032 do not include the DL device driver, the application VMOSX 1021 and the application VMOSY 1031 have the same function. Moreover, when the DL application X 1022 includes the DL device driver, the application VM creating unit 1300 creates the application VMOSX 1021 by adding a function of the DL device driver to the OS 1315.

Here, as stated above, the device 110 according to Embodiment 1 of the present invention creates the virtual machines for the respective DL applications, and causes the virtual machines to execute the DL applications. Consequently, an OS is required for each application, which leads to a problem that a capacity of the nonvolatile memory device 1240 for storing the OSs needs to be increased. In response, the application VM creating unit 1300 creates the OS for each application, using the common OS 1315. This makes it only necessary to store only the single OS 1315 in the nonvolatile memory device 1240, and thus it is possible to reduce the capacity of the nonvolatile memory device 1240.

Next, the application VM creating unit 1300 writes, into the memory 1220, the application received from the universal OS 1011 (S1103). Moreover, the application VM creating unit 1300 refers to, as a write address, an address described in the header information 1310 of the application-executing VM 1241. Furthermore, the application VM creating unit 1300 registers, in the VM managing unit 1302, the application VM created from the application-executing VM 1241 and the application, and assigns, to the created application VM, an ID for identifying the application VM (virtual machine).

Next, the application VM creating unit 1300 obtains an ID (ID 1) of a virtual machine which executes the universal OS 1011 requesting the VM creation process, and an ID (ID 2) of the created application VM. Moreover, the application VM creating unit 1300 stores, into the parent and child relationship managing unit 1304, a parent and child relationship in which the ID 1 refers to a "parent" and the ID 2 refers to a "child" (S1104).

Next, the application VM creating unit 1300 requests the VM managing unit 1302 to execute the created application VM. This enables the VM managing unit 1302 to execute the application VM (S1105). In the executed application VM, the application VMOS is executed, and further the DL application is executed.

On the other hand, when the application load unit 1400 determines "NO" in step S1101, the application load unit 1400 registers, in the universal OS 1011, the obtained application as an application which operates on the universal OS 1011, and executes the application (S1106).

<Processing at Time of OS Process Request>

When the application VMOSX 1021 or the application VMOSY 1031 receives an OS process request from a corresponding one of the DL applications X 1022 and Y 1032 which operate on the respective applications VMOSX 1021 and VMOSY 1031, the application VMOSX 1021 or the application VMOSY 1031 requests the virtualization software 1001 to execute the OS process. Upon receiving the OS process request, the virtualization software 1001 requests the universal OS 1011 which is capable of executing the OS process to execute the OS process.

Figure 21:
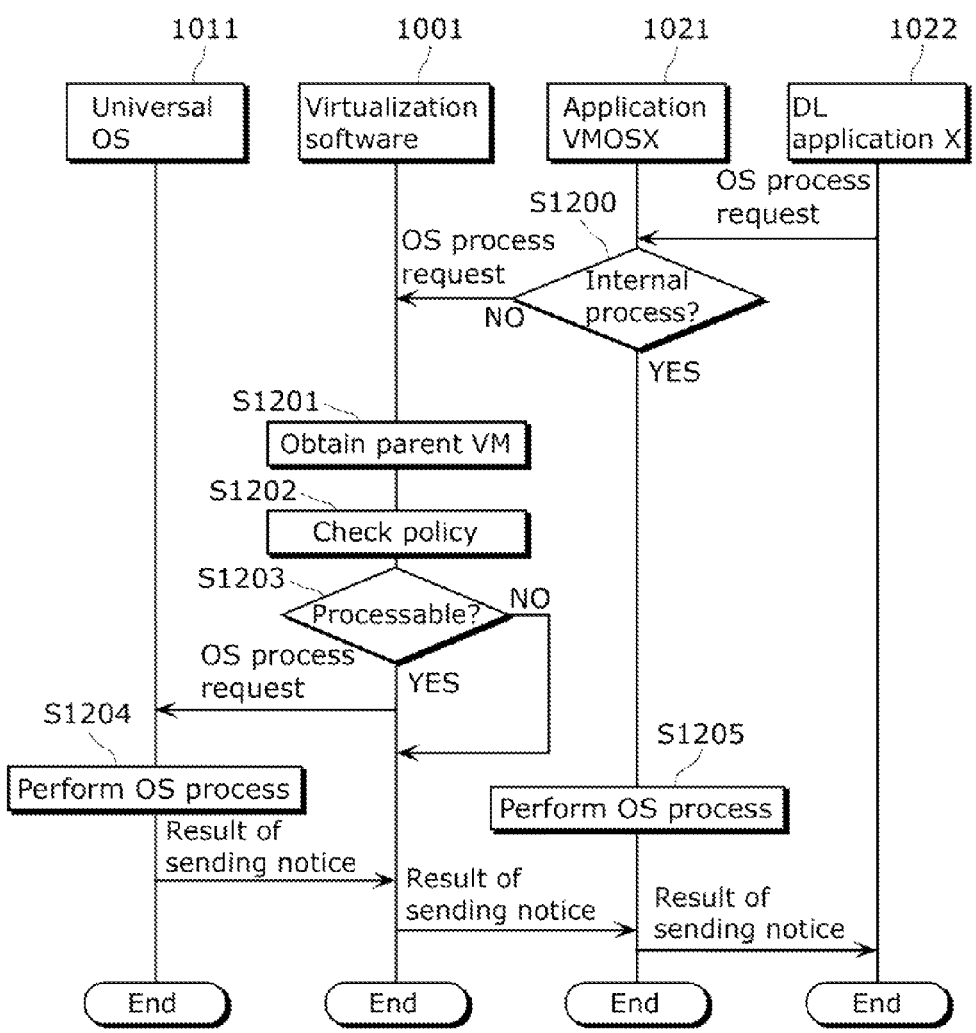
FIG. 21 is a flow chart for OS process request according to Embodiment 1 of the present invention.

The following describes processing of an OS process request from an DL application with reference to a flow chart shown by FIG. 21. Hereinafter, a case is described where the universal OS 1011 handles an OS process request from the DL application X 1022 operating on the application VMOSX 1021. Here, it is assumed that the virtual machine ID of the virtual machine 1002 operated by the universal OS 1011 is "1", and that the virtual machine ID of the virtual machine 1003 operated by the application VMOSX 1021 and the DL application X 1022 is "3". It is also assumed that a set of the parent virtual machine ID "1" and the child virtual machine ID "3" is registered in the parent and child relationship management 1360 as shown by FIG. 14.

In FIG. 21, the DL application X 1022 issues a system call such as access to a device, to request the application VMOSX 1021 to execute an OS process. The requested application VMOSX 1021 determines whether the requested OS process is a process to be executed inside the application VMOSX 1021 or a process of requesting another virtual machine (S1200). The application VMOSX 1021 determines "YES" when it is determined that the requested OS process is the process to be executed inside the application VMOSX 1021, and "NO" when it is determined otherwise.

Specifically, the application VMOSX 1021 determines whether or not the application VMOSX 1021 successfully executes the requested OS process. For instance, when the application VMOSX 1021 includes functions of a DL device driver and the requested OS process is a process of the DL device driver, the application VMOSX 1021 determines that the application VMOSX 1021 successfully executes the OS process (the OS process is the process to be executed inside the application VMOSX 1021). Moreover, when the requested OS process is other than the process of the DL device driver, the application VMOSX 1021 determines that the application VMOSX 1021 fails to execute the OS process (the OS process is the process of requesting the other virtual machine).

When determining "NO" in step S1200, the application VMOSX 1021 requests the virtualization software 1001 to execute the OS process. The OS process request control unit 1303 of the virtualization software 1001 checks with the parent and child relationship managing unit 1304 so as to determine which virtual machine is a virtual machine that is a "parent" of the virtual machine having requested the OS process, and obtains the identifier of the "parent" virtual machine (S1201). The checked parent and child relationship managing unit 1304 searches the child virtual machine ID column of the parent and child relationship management 1360 for the ID (in this case "3") of the virtual machine having requested the OS process. Then, the parent and child relationship managing unit 1304 obtains a parent virtual machine ID (in this case "1") that is managed with the searched ID as a set, and notifies the OS process request control unit 1303 of the obtained parent virtual machine ID.

Next, the OS process request control unit 1303 requests the policy managing unit 1305 to check whether the requested OS process complies with a policy. The requested policy managing unit 1305 checks the compliance with the policy with reference to the policy table 1370 (S1202). Moreover, the policy managing unit 1305 obtains, from the policy table 1370, a virtual machine ID of a virtual machine providing the function, and checks whether the virtual machine ID is a special ID indicating use prohibition (in the case shown by FIG. 15A, "0"). When the virtual machine ID is the special ID, the policy managing unit 1305 feeds back "NO" as the check result. Moreover, when the virtual machine ID is not the special ID, the policy managing unit 1305 feeds back "YES" as the check result.

The OS process request control unit 1303 determines whether the check result in step S1202 indicates "YES" (S1203).

When determining "YES" in step S1203, the OS process request control unit 1303 requests the universal OS 1011 operating on the virtual machine 1002 that is the "parent" to execute the OS process.

The universal OS 1011 executes the requested OS process (S1204), and notifies the universal OS 1001 of the result of the executed OS process. The virtualization software 1001 notifies the application VMOSX 1021 of the notified result. The application VMOSX 1021 further notifies the DL application X 1022 of the notified result.

In contrast, when determining "NO" in step S1203, the OS process request control unit 1303 notifies the application VMOSX 1021 of an error as the result.

Moreover, when determining "YES" in step S1200, the application VMOSX 1021 executes the OS process internally (S1205). Then, the application VMOSX 1021 notifies the DL application X 1022 of the result of the executed OS process.

It is to be noted that although the case is described where the DL application X 1022 requests the OS process and the universal OS 1011 executes the OS process, the present invention is not limited to the case. For example, an application operating on another application VM may request the OS process, and an OS other than the universal OS 1011 may execute the OS process.

Here, as stated above, the device 110 according to Embodiment 1 of the present invention creates the virtual machines for the respective DL applications, and causes the virtual machines to execute the DL applications. Consequently, an OS is required for each virtual machine, which leads to a problem that a capacity of necessary hardware (e.g. a memory) needs to be increased. In response, in the device 110 according to Embodiment 1 of the present invention, the virtual machine created for the DL application requests another virtual machine to execute the OS process which the OS of the virtual machine fails to execute. Accordingly, the function of the OS of the virtual machine created for the DL application can be eliminated, and thus the capacity of the necessary hardware can be reduced. For instance, the OS may achieve only the function of requesting an OS process and the function of a DL device driver.

<Block Diagram of Application-Executing VM Creating Device 1600>

Figure 22:
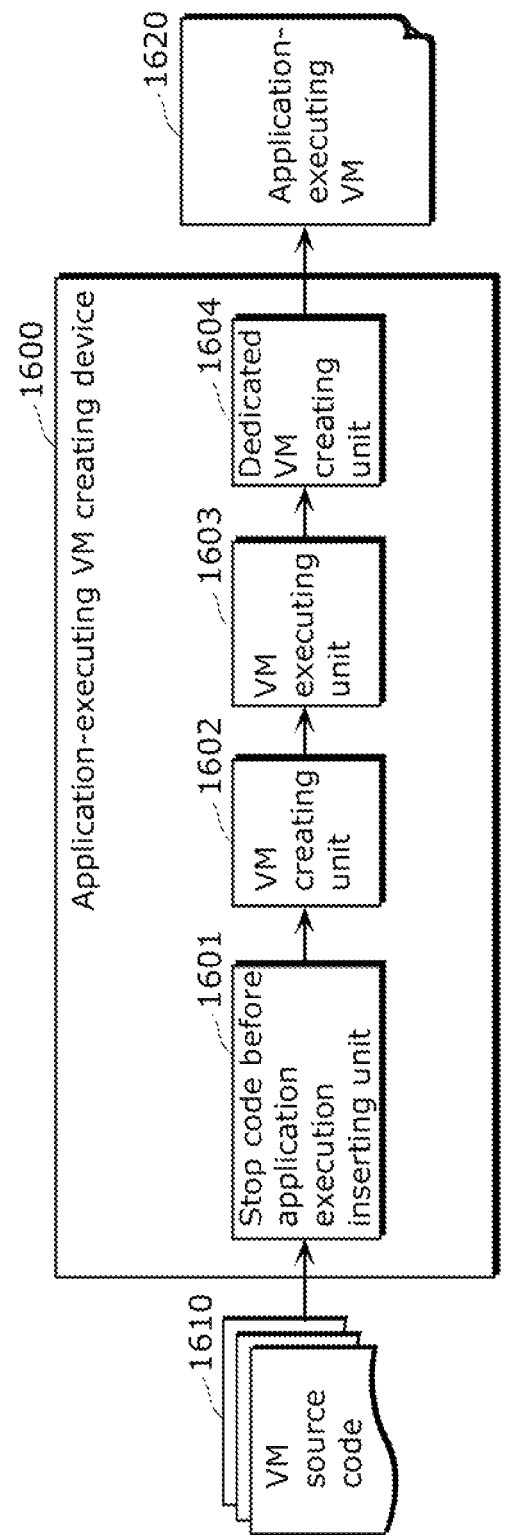
FIG. 22 is a block diagram showing an application-executing VM creating device according to Embodiment 1 of the present invention.

FIG. 22 is a block diagram showing an application-executing VM creating device 1600 according to Embodiment 1 of the present invention.

The application-executing VM creating device 1600 shown by FIG. 22 includes a stop code before application execution inserting unit 1601, a VM creating unit 1602, a VM executing unit 1603, and a dedicated VM creating unit 1604. The application-executing VM creating device 1600 receives a VM source code 1610, and creates an application-executing VM 1620. The application-executing VM 1620 is stored as the application-executing VM 1241 into the nonvolatile memory device 1240 in the device 110 or 111.

The VM source code 1610 includes a source code of an application VMOS and configuration information of a virtual hardware. A string (stop identifier) (e.g. "PRE_APP_EXEC:") is inserted in the source code of the application VMOS immediately before the application VMOS loads, to the memory 1220, an application which operates on the application VMOS, the string indicating that the application VMOS loads, to the memory 1220, the application.

The stop code before application execution inserting unit 1601 detects the stop identifier inserted in the VM source code 1610, and replaces the stop identifier with a notification command (hypercall or hypervisor call) from the application VMOS to the virtualization software 1001.

The VM creating unit 1602 creates an executable image file of a VM by performing a compilation process and a link process on the VM source code 1610.

The VM executing unit 1603 has a function equivalent to that of the virtualization software 1001, and executes the executable image file of the VM. The VM of which executable image file is executed first performs a process up to the notification command which is embedded instead of the stop identifier, and then performs a notification process to the VM executing unit 1603. Upon receiving the notification, the VM executing unit 1603 terminates the process of the VM.

The dedicated VM creating unit 1604 creates the VM main portion 1311 of the application-executing VM 1620 from a state (data on a memory, a value of a register of a CPU, and so on) of the stopped VM and the executable image file of the VM. Furthermore, the dedicated VM creating unit 1604 generates the header information 1310 and the verification value 1312, and creates the application-executing VM 1620 by combining the header information 1310 and the verification value 1312.

The application-executing VM 1620 includes a VM image file stopped in a state immediately before an application is loaded after the application VMOS starts.

It is to be noted that, here, although the stop identifier is inserted immediately before the application is loaded to the memory 1220, the present invention is not limited to this. For instance, the stop identifier may be inserted immediately after the application is loaded to the memory 1220.

Moreover, here, although the stop code before application execution inserting unit 1601 replaces the stop identifier with the notification command (hypercall), the present invention is not limited to this. For example, the stop code before application execution inserting unit 1601 may automatically detect a position at which the file is stopped, by analyzing the VM source code 1610, and insert the notification command in the detected position. The notification command may be not the hypercall but a breakpoint command or dedicated interrupt command.

As described above, according to Embodiment 1 of the present invention, the universal OS 1011 determines whether the application to be executed is the DL application, when executing the application, and causes the DL application to operate on the virtual machine (application VM) for the DL application, when determining that the application is the DL application. Consequently, it is possible to prevent the DL application from accessing the data used by another application operating on the universal OS 1011 and another DL application.

Moreover, the device 110 dynamically creates the application VM at the time of executing the DL application, and thus the application VM does not always occupy the memory 1220. Furthermore, the application VMOS is configured to request the virtualization software 1001 to execute the OS process, and thus it is possible to reduce the size of the application VMOS. As a result, it is possible to reduce the size of the memory 1220 used when executing the application VM. Thus, the application distribution system 100 according to Embodiment 1 of the present invention can be applied to cellular phones having scarce resources such as a memory and home electric appliances such as TVs.

Moreover, commonalizing the application VMOS of the virtual machine for executing the DL application makes it possible to reduce an amount of OS data to be stored.

The application VMOS determines whether to (i) request the virtualization software 1001 to execute the OS process or (ii) execute the OS process internally. As a result, processes which become, if performed by the universal OS 1011, problematic in terms of security are successfully executed inside the application VMOS. Thus, even when the DL application is an attack application, it is possible to prevent the DL application from attacking the universal OS 1011. Moreover, when the virtualization software 1001 receives the OS process request, the virtualization software 1001 and the application VMOS each determine whether a process which becomes problematic in terms of the security is a process to be originally executed inside the application VMOS. Consequently, in comparison with the case where only the application VMOS makes the determination, it is possible to further increase the security.

As described above, the application distribution system 100 according to Embodiment 1 of the present invention makes it possible to prevent the malicious application and the malicious device driver from leaking and tampering with the information assets. Consequently, the user can safely use the device.

Embodiment 2

Embodiment 2 of the present invention describes a configuration in which a function of causing the universal OS 1011 to execute an OS process of an application VM is not included, as opposed to the configuration described in Embodiment 1 of the present invention.

The following describes configurations and creation processes of the virtualization software 1001 and the universal OS 1011 according to Embodiment 2 of the present invention. It is to be noted that the same reference signs are assigned to the same components and processes as those in Embodiment 1 of the present invention, and descriptions thereof are omitted.

<Configuration of Virtualization Software 1001>

Figure 23:
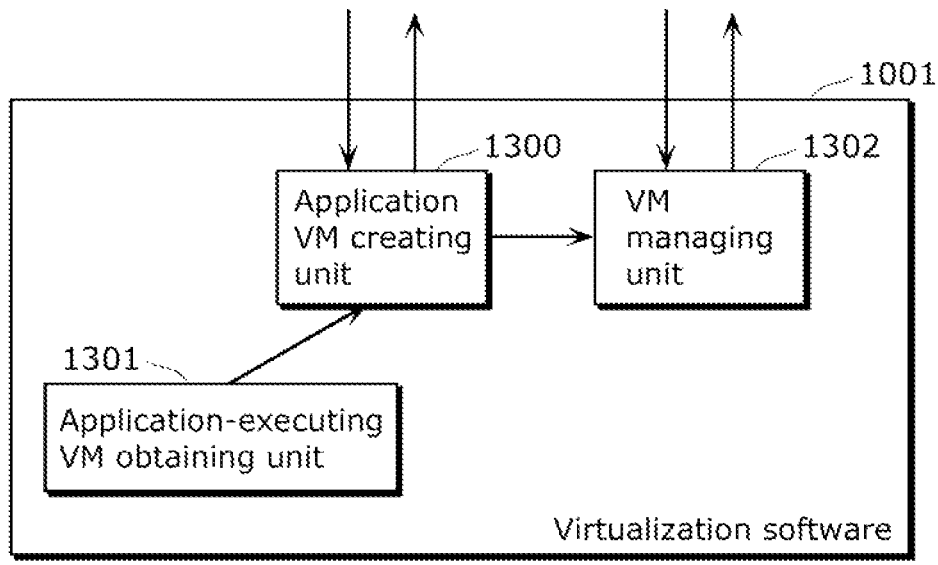
FIG. 23 is a block diagram showing a virtualization software according to Embodiment 2 of the present invention.

FIG. 23 is a block diagram showing the virtualization software 1001 according to Embodiment 2 of the present invention.

The virtualization software 1001 shown by FIG. 23 includes the application VM creating unit 1300, the application-executing VM obtaining unit 1301, and the VM managing unit 1302.

Upon receiving, from a virtual machine which operates on the virtualization software 1001, a request to create a VM (application VM), the application VM creating unit 1300 creates a VM (application VM) for executing DL application from an application-executing VM and a DL application transmitted from the virtual machine. Moreover, the application VM creating unit 1300 requests the VM managing unit 1302 to manage the created virtual machine. Here, unlike Embodiment 1 of the present invention, the application VM creating unit 1300 neither recognizes a parent and a child nor registers the parent and the child in the parent and child relationship managing unit.

It is to be noted that the application-executing VM obtaining unit 1301 and the VM managing unit 1302 are the same as those described in Embodiment 1 of the present invention.

<Configuration of Universal OS 1011>

Figure 24:
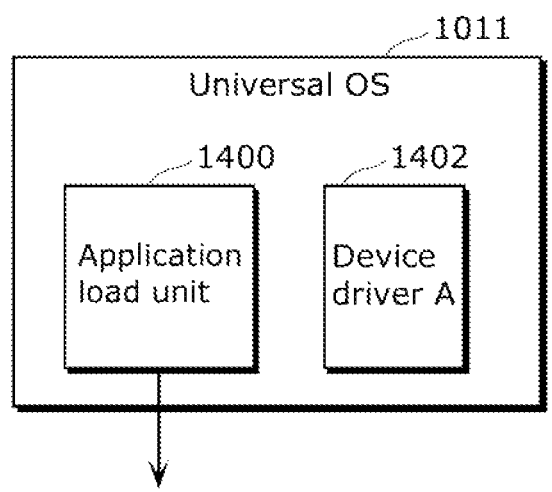
FIG. 24 is a block diagram showing a universal OS according to Embodiment 2 of the present invention.

FIG. 24 is a block diagram showing the universal OS 1011 according to Embodiment 2 of the present invention.

The universal OS 1011 shown by FIG. 24 includes the application load unit 1400 and the device driver A 1402. Unlike Embodiment 1 of the present invention, the universal OS 1011 does not receive, from another virtual machine, an OS process request, and thus does not have a necessary function of receiving an OS process request.

The application load unit 1400 and the device driver A 1402 are the same as those described in Embodiment 1 of the present invention.

In Embodiment 2 of the present invention, the application VMOSX 1021 and the application VMOSY 1031 have the same configuration as the universal OS 1011. It is to be noted that the application load unit 1400 may have the same configuration as the universal OS 1011, that in the configuration shown by FIG. 17A, the application load unit 1400 may not include the determining unit 1411 and the VM creation requesting unit 1413, and may cause the load unit 1412 to load, after the application obtaining unit 1410 obtains an application, the application on an application VMOS, and that the application load unit 1400 may have a configuration in which an application operating on an application VMOS is prohibited from starting another application.

<Application VM Creation Process>

An application VM creation process according to Embodiment 2 of the present invention is largely the same as the application VM creation process (FIG. 20) according to Embodiment 1 of the present invention.

However, the virtualization software 1001 according to Embodiment 2 of the present invention has no function of controlling an OS process request from an application VM, and thus does not register the parent and child relationship in step S1104. As a result, the application VM creating unit 1300 creates the application VM from the application-executing VM and the DL application (S1102 and S1103), registers the created application VM in the VM managing unit 1302, and then requests the VM managing unit 1302 to execute the created application VM. The requested VM managing unit 1302 executes the application VM (S1105).

It is to be noted that processes other than the above are the same as those in Embodiment 1 of the present invention.

As described above, according to Embodiment 2 of the present invention, the universal OS 1011 determines whether the application to be executed is the DL application, when executing the application, and causes the DL application to operate on the virtual machine (application VM) for the DL application, when determining that the application is the DL application. Thus, the application distribution system 100 according to Embodiment 2 of the present invention makes it possible to prevent the DL application from accessing the data used by the application operating on the universal OS 1011 or another DL application.

As described above, the application distribution system 100 according to Embodiment 2 of the present invention makes it possible to prevent the malicious application and the malicious device driver from leaking and tampering with the information assets. Consequently, the user can safely use the device.

Embodiment 3

Embodiment 3 of the present invention describes a configuration in which a function of creating a virtual machine is not included, as opposed to the configuration described in Embodiment 1 of the present invention.

The following describes configurations and creation processes of the virtualization software 1001 and the universal OS 1011 according to Embodiment 3 of the present invention. It is to be noted that the same reference signs are assigned to the same components and processes as those in Embodiment 1 of the present invention, and descriptions thereof are omitted.

<Configuration of Virtualization Software 1001>

Figure 25:
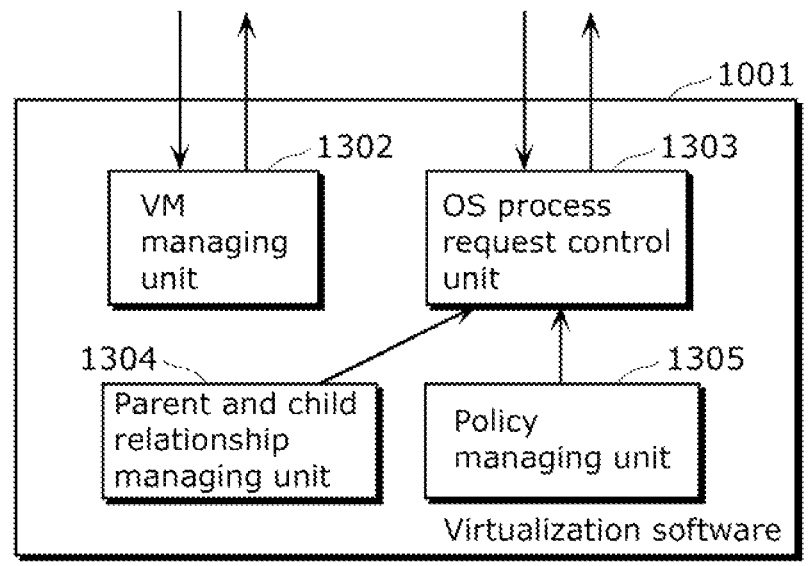
FIG. 25 is a block diagram showing a virtualization software according to Embodiment 3 of the present invention.

FIG. 25 is a block diagram showing the virtualization software 1001 according to Embodiment 3 of the present invention.

The virtualization software 1001 shown by FIG. 25 includes the VM managing unit 1302, the OS process request control unit 1303, the parent and child relationship managing unit 1304, and the policy managing unit 1305.

It is to be noted that the VM managing unit 1302, the OS process request control unit 1303, the parent and child relationship managing unit 1304, and the policy managing unit 1305 are the same as those described in Embodiment 1 of the present invention.

<Configuration of Universal OS 1011>

Figure 26:
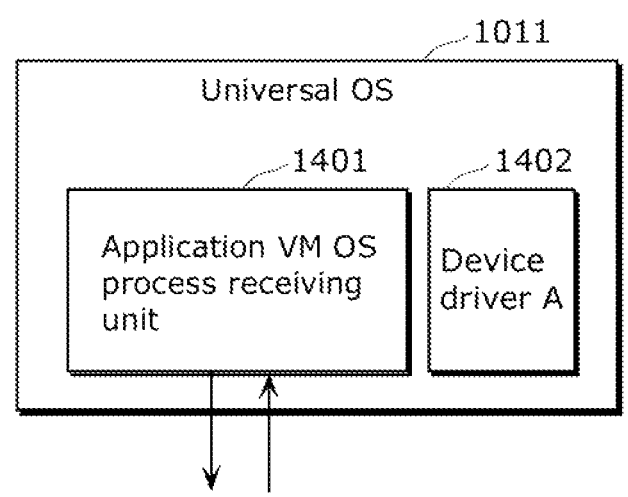
FIG. 26 is a block diagram showing a universal OS according to Embodiment 3 of the present invention.
Figure 27:
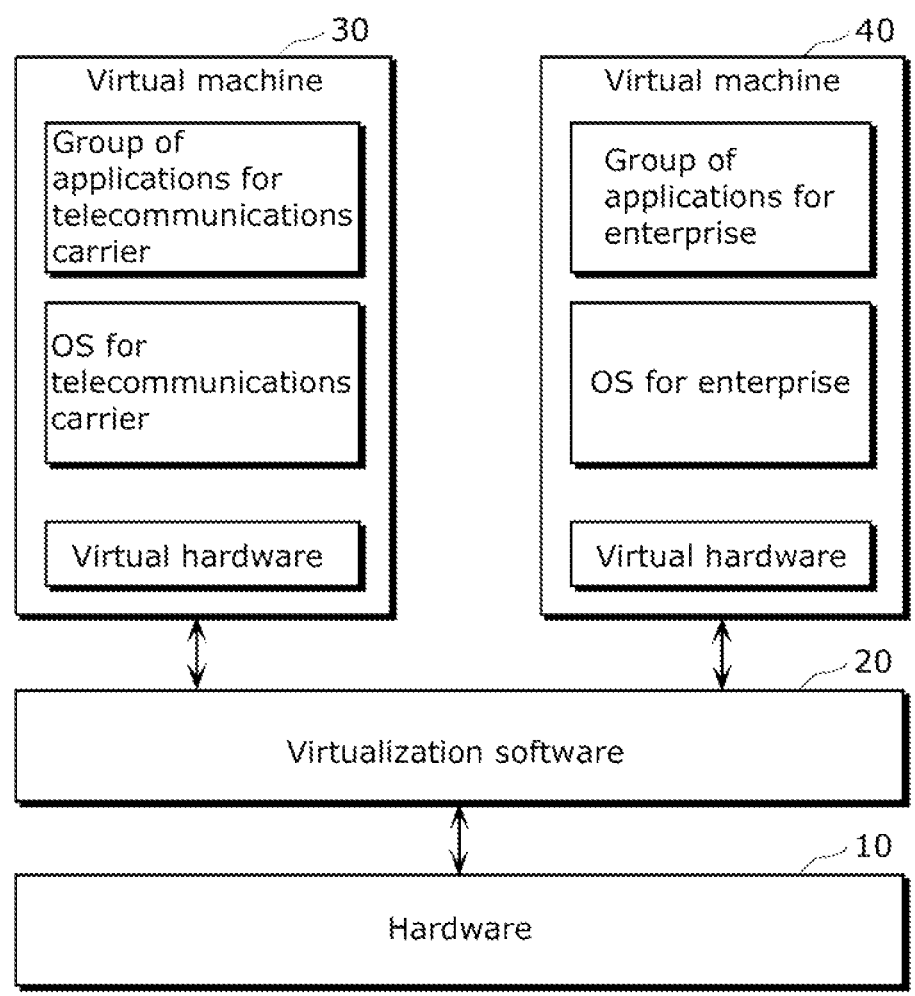
FIG. 27 is a block diagram showing a cellular phone for which an execution environment is separated using conventional virtualization technology.
Figure 28:
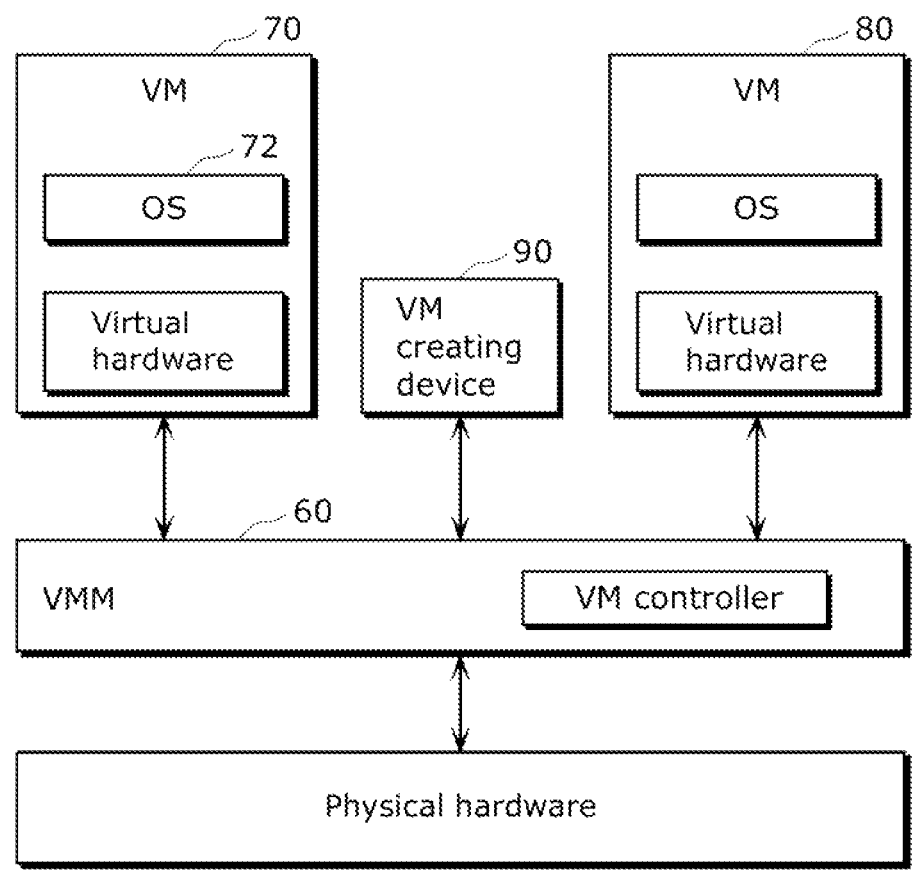
FIG. 28 is a block diagram showing a conventional virtual machine creating system.

FIG. 26 is a block diagram showing the universal OS 1011 according to Embodiment 3 of the present invention.

The universal OS 1011 shown by FIG. 26 includes the application VM OS process receiving unit 1401 and the device driver A 1402.

The application VM OS process receiving unit 1401 and the device driver A 1402 are the same as those described in Embodiment 1 of the present invention.

It is to be noted that although the present invention has been described based on the embodiments, it goes without saying that the present invention is not limited to the embodiments. The present invention includes the following cases.

(1) Although the DL application according to the embodiments is downloaded from the application distribution server 120, the present invention is not limited to this. For instance, the DL application may be an application installed from an apparatus for development or a PC connected through a USB, or may be originally installed at the time of shipment of the device 110.

(2) The software configuration of each of the devices 110 and 111 according to the embodiments may not include the virtual machine 1005 including the RTOS 1041, or may include virtual machines 1002 each of which includes the universal OS 1011 or virtual machines 1005 each of which includes the RTOS 1041. Moreover, the software configuration may include a virtual machine which does not include an OS, or a virtual machine on which an application involving an OS function operates. Furthermore, these virtual machines may request the virtualization software 1001 to create an application VM. Here, each of the virtual machines is registered as a separate parent in the parent and child relationship managing unit 1304.

(3) Although the application VM according to the embodiments is loaded to the memory 1220 at the time of executing the DL application, and is executed, the present invention is not limited to this. For example, the virtualization software 1001 may load only the application-executing VM 1241 to the memory 1220 prior to the execution of the DL application, and load the DL application to the memory 1220 at the time of executing the DL application. Moreover, the virtualization software 1001 may load the application-executing VM 1241 and the DL application to the memory 1220 before the execution of the DL application.

(4) Although the application-executing VM 1241 according to the embodiments includes the VM image file stopped, using the application-executing VM creating device 1600, in a state immediately before the application is loaded after the application VMOS starts, the present invention is not limited to this. For instance, the application-executing VM 1241 may include a VM image file in a state before the application VMOS starts. Here, the application VMOS may start for each DL application, or an application VM stopped in a state immediately before the application is loaded may be started in advance, the application VM stopped in the state immediately before the application is loaded may be copied at the time of executing the DL application, and the copied application VM may execute the DL application.

(5) Each of the above devices is specifically a computer system including, for instance, a microprocessor, a ROM, a RMA, a hard disk unit, a display unit, a keyboard, and a mouse. A computer program is stored in the RAM or the hard disk unit. The microprocessor operates according to the computer program, so that each device performs a corresponding function. Here, in order to perform a predetermined function, the computer program is programmed by combining instruction codes each indicating an instruction for a computer.

(6) Part or all of the elements included in each device may be included in one system LSI (Large Scale Integration). The system LSI is a super-multifunctional LSI manufactured by integrating the elements on one chip, and is specifically a computer system including a microprocessor, a ROM, a RAM, and so on. A computer program is stored in the RAM. The microprocessor operates according to the computer program, so that the system LSI performs its function.

Moreover, the elements included in each device may be integrated into individual chips, or into a single chip so as to include part or all of the elements.

Here, although an integrated circuit is referred to as the system LSI, the integrated circuit may also be referred to as an IC, an LSI, a super LSI, or an ultra LSI. In addition, a circuit integration method is not limited to the LSI, and may be realized with a dedicated circuit or a general-purpose processor. FPGA (Field Programmable Gate Array) that can be programmed after the manufacture of the LSI or a reconfigurable processor which can reconfigure connection or setting of circuit cells in the LSI may be used.

Additionally, if a new circuit integration technique is introduced in place of the LSI along with development in semiconductor technology or other derivative technology, it is obvious that the technique may be used for integrating functional blocks. There is a possibility of applying biotechnology and the like.

(7) Part or all of the elements included in each device may be included in an IC card detachable to each device or in a stand-alone module. The IC card or the module is a computer system including a microprocessor, a ROM, a RAM, and so on. The IC card or the module may include the super-multifunctional LSI. The microprocessor operates according to a computer program, so that the IC card or the module performs its function. The IC card or the module may have tamper-resistance.

(8) The present invention may be any of the above methods. Moreover, the present invention may be a computer program which causes a computer to perform these methods or a digital signal included in the computer program.

Furthermore, in the present invention, the computer program or the digital signal may be recorded on a computer-readable recording medium such as a flexible disk, a hard disk, a CD-ROM, an MO, a DVD, a DVD-ROM, a DVD-RAM, a BD (Blu-ray Disc), and a semiconductor memory. In addition, the present invention may be the digital signal recorded on these recording media.

Moreover, in the present invention, the computer program or the digital signal may be transmitted via an electric telecommunication line, a wireless or wired telecommunication line, a network represented by the Internet, data broadcasting, or the like.

Furthermore, the present invention may be a computer system including a microprocessor and a memory. The computer program may be stored in the memory, and the microprocessor may operate according to the computer program.

Moreover, by recording the program or the digital signal on the recording medium to transfer it, or by transferring the program or the digital signal via the network or the like, the present invention may be implemented on another independent computer system.

(9) The embodiments and the modifications may be combined.

INDUSTRIAL APPLICABILITY

The present invention can be applied to information processing devices which use downloaded applications and device drivers. In addition, the present invention is useful to, for example, cellular phones and home electric appliances such as televisions which include the information processing devices.

REFERENCE SIGNS LIST

10 Hardware
20, 1001 Virtualization software
30, 40, 70, 80, 1002, 1003, 1004, 1005 Virtual machine
60 VMM
72, 1315 OS
90 VM creating device
100 Application distribution system
110, 111 Device
120 Application distribution server
130 Apparatus for development
1000 Normal software execution environment (normal environment)
1010, 1020, 1030, 1040, 1316 Virtual hardware
1011 Universal OS
1012 Download control application
1013 Application A
1014 Application B
1021 Application VMOSX
1022, 1242 DL application X
1031 Application VMOSY
1032, 1243 DL application Y
1041 RTOS
1042 Phone call software
1100 Secure software execution environment (secure environment)
1101 Secure OS
1102 Secure boot unit
1200 System LSI
1201 CPU
1202 IPL (Initial Program Loader)
1203 Execution environment switching unit
1204 Internal secure memory
1220 Memory
1240 Nonvolatile memory device
1241, 1620 Application-executing VM
1300 Application VM creating unit
1301 Application-executing VM obtaining unit
1302 VM managing unit
1303 OS process request control unit
1304 Parent and child relationship managing unit
1305 Policy managing unit
1310 Header information
1311 VM main portion
1312 Verification value
1350 Virtual machine management table
1360 Parent and child relationship management
1370, 1371 Policy table
1400 Application load unit
1401 Application VM OS process receiving unit
1402 Device driver A
1410 Application obtaining unit
1411 Determining unit
1412 Load unit
1413 VM creation requesting unit
1500 OS process requesting unit
1501 Device driver B
1510 OS process receiving unit
1511 Request determining unit
1512 Internal processing unit
1513 Requesting unit
1600 Application-executing VM creating device
1601 Stop code before application execution inserting unit
1602 VM creating unit
1603 VM executing unit
1604 Dedicated VM creating unit
1610 VM source code
2000 Application holding unit
2001 Application reception processing unit
2002 Application transmission processing unit
3000 Package generating unit
3001 Configuration file generating unit
3002 Key pair holding unit
3003 Key pair generating unit
3004 Debug processing unit
3005 Upload processing unit
3100 Compiler
3101 Linker 3102 Package generation tool
3110 Source code
3120 Download package
3130 Private key
3131, 3204 Public key certificate
3132, 3202 Configuration file
3200 Application
3201 Device driver
3203 Application signature list

The invention claimed is:

1. An information processing device having a plurality of virtual machines, said information processing device comprising:
- a processor; and
- a virtual machine managing unit configured to manage, using the processor, the virtual machines,
- wherein said virtual machine managing unit includes an application virtual machine (VM) creating unit configured to create a virtual machine for executing a program,
- a first virtual machine includes first virtual hardware and a first operating system (OS) and determines whether a first program is to be executed on the first virtual machine or to be executed on a second virtual machine, the first virtual machine being one of the virtual machines, and the first program being executable on the first virtual machine,
- said application VM creating unit is configured to create the second virtual machine, when the first virtual machine determines that the first program is to be executed on the second virtual machine,
- when the first program is a program downloaded from another device, the first virtual machine determines that the first program is to be executed on the second virtual machine,
- the second virtual machine includes second virtual hardware and a second OS having only part of functions of the first OS, and executes the first program,
- the second virtual machine includes an OS process requesting unit configured to, when an OS process inexecutable on the second OS is requested by the first program, send, to said virtual machine managing unit, an OS process request for requesting the first virtual machine to execute the OS process,
- said virtual machine managing unit further includes:
- an OS process request control unit configured to request the first virtual machine to execute the OS process, when said virtual machine managing unit receives the OS process request from the second virtual machine; and
- a policy managing unit configured to hold information indicating, among functions of said information processing device, a function of prohibiting the second virtual machine from requesting the first virtual machine to execute the OS process, and determine, based on the information, whether or not it is possible for the second virtual machine to request the first virtual machine to execute the OS process,
- said OS process request control unit is configured to request the first virtual machine to execute the OS process, when said policy managing unit determines that it is possible for the second virtual machine to request the first virtual machine to execute the OS process,
- said OS process requesting unit is configured to determine whether or not the OS process requested by the first program is executable by a device driver software program included in the second virtual machine,
- when the OS process requested by the first program is executable by the device driver software program, the OS process requested by the first program is executed within the second virtual machine, and
- when the OS process requested by the first program is not executable by the device driver software program, the first virtual machine is requested to execute the OS process requested by the first program.

2. The information processing device according to claim 1, wherein when the first program includes a device driver software program obtained from another device, the first virtual machine determines that the first program is to be executed on the second virtual machine.

3. The information processing device according to claim 2, further comprising
a storage unit configured to store an OS program for VM,
wherein the first virtual machine further determines whether a second program is to be executed on the first virtual machine or to be executed on a third virtual machine, the second program being different from the first program and executable on the first virtual machine, and
said application VM creating unit is configured to (i) create the third virtual machine, when the first virtual machine determines that the second program is to be executed on the third virtual machine, and (ii) create, using the OS program for VM, an operating system for the second virtual machine and an operating system for the third virtual machine.

4. The information processing device according to claim 3, wherein the second virtual machine includes a VM image file stopped in a state immediately before a program is loaded after an operating system for a virtual machine starts.

5. The information processing device according to claim 1, further comprising
a storage unit configured to store an OS program for VM,
wherein the first virtual machine further determines whether a second program is to be executed on the first virtual machine or to be executed on a third virtual machine, the second program being different from the first program and executable on the first virtual machine, and
said application VM creating unit is configured to (i) create the third virtual machine, when the first virtual machine determines that the second program is to be executed on the third virtual machine, and (ii) create, using the OS program for VM, an operating system for the second virtual machine and an operating system for the third virtual machine.

6. The information processing device according to claim 5, wherein the second virtual machine includes a VM image file stopped in a state immediately before a program is loaded after an operating system for a virtual machine starts.

7. The information processing device according to claim 1, wherein said virtual machine managing unit further includes a parent and child relationship managing unit configured to manage a parent and child relationship of the virtual machines,
said parent and child relationship managing unit is configured to manage a parent and child relationship in which the first virtual machine that requests the creation of the second virtual machine is a parent and the second virtual machine created according to the request is a child, and
said OS process request control unit is configured to request the first virtual machine to execute the OS process, when said virtual machine managing unit receives the OS process request from the second virtual machine, the first virtual machine being managed as the parent of the second virtual machine.

8. The information processing device according to claim 1, wherein said OS process requesting unit is configured to (i) determine that the second virtual machine executes the OS process, when the first program includes the device driver software program obtained from the other device and the device driver software program can execute the OS process, and (ii) send the OS process request to said virtual machine managing unit when the device driver software program cannot execute the OS process.

9. The information processing device according to claim 1, wherein the OS process request control unit is configured to request the first virtual machine to execute the OS process, using a callback function, dedicated interruption, or a system call.

10. An application distribution system which distributes a program via a network, said application distribution system comprising:
said information processing device according to claim 1; and
an application distribution server,
wherein said application distribution server includes:
an application holding unit configured to hold a program to be distributed; and
an application transmission processing unit configured to transmit the program to said information processing device, and
when the first program is the program transmitted by said application transmission processing unit, the first virtual machine determines that the first program is to be executed on the second virtual machine.

11. A virtual machine creation method performed by an information processing device which has a plurality of virtual machines and includes a virtual machine managing unit that manages the virtual machines, said virtual machine creation method comprising:
creating a virtual machine for executing a program, said creating being performed by the virtual machine managing unit;
determining whether a first program is to be executed on a first virtual machine including first virtual hardware and a first operating system (OS) or to be executed on a second virtual machine, said determining being performed by the first virtual machine, the first virtual machine being one of the virtual machines, and the first program being executable on the first virtual machine,
wherein when the first virtual machine determines that the first program is to be executed on the second virtual machine, the second virtual machine for executing the first program is created in said creating,
said virtual machine creation method further comprising:
determining that the first program is to be executed on the second virtual machine, when the first program is a program downloaded from another device, the second virtual machine (i) including second virtual hardware and a second OS having only part of the function of the first OS and (ii) executing the first program, said determining being performed by the first virtual machine;
sending, to the virtual machine managing unit when an OS process inexecutable on the second OS is requested by the first program, an OS process request for requesting the first virtual machine to execute the OS process, said sending being performed by the second virtual machine;
requesting the first virtual machine to execute the OS process, when the virtual machine managing unit receives the OS process request from the second virtual machine, said requesting being performed by the virtual machine managing unit; and
determining, based on information indicating, among functions of the information processing device, a function prohibiting the second virtual machine from requesting the first virtual machine to execute the OS process, whether or not it is possible for the second virtual machine to request the first virtual machine to execute the OS process, the information being held by the information processing device, and said determining of whether or not it is possible being performed by the virtual machine managing unit,
when it is determined that it is possible for the second virtual machine to request the first virtual machine to execute the OS process, the first virtual machine is requested to execute the OS process in said requesting,
said requesting includes determining whether or not the OS process requested by the first program is executable by a device driver software program included in the second virtual machine,
when the OS process requested by the first program is executable by the device driver software program, the OS process requested by the first program is executed within the second virtual machine, and
when the OS process requested by the first program is not executable by the device driver software program, the first virtual machine is requested to execute the OS process requested by the first program.

12. A non-transitory computer-readable recording medium for use in a computer, the recording medium having a computer program recorded thereon for causing the computer to execute the virtual machine creation method according to claim 11.

13. A semiconductor integrated circuit having a plurality of virtual machines, said semiconductor integrated circuit comprising
a virtual machine managing unit configured to manage the virtual machines,
wherein said virtual machine managing unit includes an application virtual machine (VM) creating unit configured to create a virtual machine for executing a program,
a first virtual machine includes first virtual hardware and a first operating system (OS), and determines whether a first program is to be executed on the first virtual machine or to be executed on a second virtual machine, the first program being executable on the first virtual machine, and the first virtual machine being one of the virtual machines,
said application VM creating unit is configured to create the second virtual machine, when the first virtual machine determines that the first program is to be executed on the second virtual machine,
when the first program is a program downloaded from another device, the first virtual machine determines that the first program is to be executed on the second virtual machine,
the second virtual machine includes second virtual hardware and a second OS having only part of functions of the first OS, and executes the first program,
the second virtual machine includes an OS process requesting unit configured to, when an OS process inexecutable on the second OS is requested by the first program, send, to said virtual machine managing unit, an OS process request for requesting the first virtual machine to execute the OS process, said virtual machine managing unit further includes:
an OS process request control unit configured to request the first virtual machine to execute the OS process, when said virtual machine managing unit receives the OS process request from the second virtual machine; and
a policy managing unit configured to hold information indicating, among functions of said information processing device, a function of prohibiting the second virtual machine from requesting the first virtual machine to execute the OS process, and determine, based on the information, whether or not it is possible for the second virtual machine to request the first virtual machine to execute the OS process,
said OS process request control unit is configured to request the first virtual machine to execute the OS process, when said policy managing unit determines that it is possible for the second virtual machine to request the first virtual machine to execute the OS process,
said OS process requesting unit is configured to determine whether or not the OS process requested by the first program is executable by a device driver software program included in the second virtual machine,
when the OS process requested by the first program is executable by the device driver software program, the OS process requested by the first program is executed within the second virtual machine, and
when the OS process requested by the first program is not executable by the device driver software program, the first virtual machine is requested to execute the OS process requested by the first program.

* * * * *